United States Patent
Lin et al.

(10) Patent No.: US 12,478,650 B2
(45) Date of Patent: Nov. 25, 2025

(54) ***Lactobacillus delbrueckii* SUBSP. LACTIS LDL557, AND COMPOSITION AND USE THEREOF**

(71) Applicant: SYNBIO TECH INC., Kaohsiung (TW)

(72) Inventors: Jin-Seng Lin, Tainan (TW); Chia-Chia Lee, Kaohsiung (TW); Ting-Yu Lee, Tainan (TW); Han-Yin Hsu, Kaohsiung (TW); Jiu-Yao Wang, Tainan (TW)

(73) Assignee: SYNBIO TECH INC., Kaohsiung (TW)

( * ) Notice: Subject to any disclaimer, the term of this patent is extended or adjusted under 35 U.S.C. 154(b) by 426 days.

(21) Appl. No.: 17/597,064

(22) PCT Filed: Oct. 18, 2021

(86) PCT No.: PCT/IB2021/059554
§ 371 (c)(1),
(2) Date: Dec. 23, 2021

(87) PCT Pub. No.: WO2022/200851
PCT Pub. Date: Sep. 29, 2022

(65) Prior Publication Data
US 2022/0370521 A1 Nov. 24, 2022

(51) Int. Cl.
*A61K 35/747* (2015.01)
*A23L 33/135* (2016.01)
*A61P 29/00* (2006.01)
*C12N 1/20* (2006.01)
*C12R 1/225* (2006.01)

(52) U.S. Cl.
CPC .......... *A61K 35/747* (2013.01); *A23L 33/135* (2016.08); *A61P 29/00* (2018.01); *C12N 1/205* (2021.05); *C12R 2001/225* (2021.05)

(58) Field of Classification Search
CPC ..... A61K 35/747; A23L 33/135; A61P 29/00; A61P 11/00; A61P 17/06; A61P 37/08; A61P 1/00; A61P 11/06; A61P 17/00; A61P 19/02; A61P 37/02; C12N 1/205; C12R 2001/225; A23V 2002/00; A23V 2400/137
See application file for complete search history.

(56) References Cited

U.S. PATENT DOCUMENTS

2010/0278795 A1   11/2010   Tategaki et al.

FOREIGN PATENT DOCUMENTS

| | | |
|---|---|---|
| CN | 107308190 A | 11/2017 |
| EP | 2 223 697 A1 | 9/2010 |

OTHER PUBLICATIONS

NCBI Database Accession No. MN336189.1 (Aug. 26, 2019, 2 pages) (Year: 2019).*
International Search Report, issued in International application No. PCT/IB2021/059554, Feb. 17, 2022 (7 pages).
Rocha, C.S. et al. Local and Systemic Immune Mechanisms Underlying the Anti-Colitis Effects of the Dairy Bacterium *Lactobacillus delbrueckii* PLOS.ONE, No. 1 vol. 9, pp. 1-8, Jan. 21, 2014.

* cited by examiner

*Primary Examiner* — David Steadman
*Assistant Examiner* — Joseph R Spangler
(74) *Attorney, Agent, or Firm* — HSML P.C.

(57) ABSTRACT

Disclosed herein is an isolated strain of *Lactobacillus delbrueckii* subsp. *lactis* LDL557, which is deposited at Deutsche Sammlung von Mikroorganismen and Zellkulturen GmbH under an accession number DSM 33617. Also disclosed herein are a composition including the isolated strain of *Lactobacillus delbrueckii* subsp. *lactis* LDL557, and use of the isolated strain of *Lactobacillus delbrueckii* subsp. *lactis* LDL557 for alleviating an inflammation-related disorder.

3 Claims, 21 Drawing Sheets
Specification includes a Sequence Listing.

Lactobacillus delbrueckii SUBSP. LACTIS LDL557, AND COMPOSITION AND USE THEREOF

CROSS-REFERENCE TO RELATED APPLICATION

This application is a national phase entry of International Application No. PCT/IB2021/059554 filed on Oct. 18, 2021, which claims priority of Taiwanese Invention Patent Application No. 110110252, filed on Mar. 22, 2021. The entire content of each of the international and Taiwanese patent applications is incorporated herein by reference.

FIELD

The present disclosure relates to an isolated strain of Lactobacillus delbrueckii subsp. Lactis LDL557, which has been deposited at Deutsche Sammlung von Mikroorganismen und Zellkulturen GmbH, Inhoffenstr. 7B, D-38124 Braunschweig, under an accession number DSM 33617. The present disclosure also relates to a composition including the isolated strain of Lactobacillus delbrueckii subsp. lactis LDL557, and use of the isolated strain of Lactobacillus delbrueckii subsp. lactis LDL557 for alleviating an inflammation-related disorder.

BACKGROUND

Inflammation-related disorders are the most significant cause of death in the world. Inflammation-related disorders have a broad spectrum involvement in many human acute and chronic diseases including allergies, arthritis and joint diseases, diabetes, colitis, and autoimmune disorders. Therapeutic management of inflammation-related disorders has focused on the development of anti-inflammatory drugs that block cytokine signaling. Currently, drugs used clinically to alleviate inflammation-related disorders include immunosuppressive drugs (such as cyclosporin) and anti-inflammatory drugs (such as corticosteroids). However, these drugs might not be able to achieve the desired therapeutic effect and may also cause severe side effects.

Probiotics are resident normal flora of the intestinal tract and believed to play important roles in regulating proper intestinal immunity and digestion by balancing intestinal microflora. These beneficial microorganisms are widely used as live microbial dietary supplements and can help restoring intestinal microfloral balance. Many species of lactic acid bacteria (LAB) are conferred with the generally recognized as safe (GRAS) status, and are widely used as probiotics.

Common LAB include Lactobacillus spp., Lactococcus spp., Pediococcus spp., Streptococcus spp., Enterococcus spp., Bifidobacterium spp., Bacillus spp., Leuconostoc spp., etc. LAB have been shown to be capable of inhibiting the growth of pathogenic bacteria in the gastrointestinal tract and alleviating lactose intolerance, and to have anti-cancer, anti-bacterial, anti-fatigue, and blood pressure lowering effects.

Previous studies demonstrated that certain strains of LAB are effective in alleviating various inflammation-related disorders. For example, it has been reported in Watanabe T. et al. (2009), J. Nutr. Sci. Vitaminol., 55:271-278 that Lactobacillus delbrueckii subsp. lactis R-037 isolated from fermented milk (Dahi, India) can effectively alleviate atopic dermatitis. In addition, Santos Rocha C. et al. disclosed that Lactobacillus delbrueckii subsp. lactis CNRZ327 isolated from cheese has the effect of treating inflammatory bowel diseases (IBD) (Santos Rocha C. et al. (2014), PLoS One, 9(1):e85923). Kano H. et al. disclosed that Lactobacillus delbrueckii subsp. bulgaricus OLL1073R-1 can prevent collagen-induced arthritis in mice (Kano H. et al. (2002), J. Food Prot., 65:153-160).

In spite of the aforesaid, there is still a need to screen a new species and/or a strain of LAB that can exhibit satisfactory efficacy in alleviating an inflammation-related disorder.

SUMMARY

Therefore, in a first aspect, the present disclosure provides an isolated strain of Lactobacillus delbrueckii subsp. lactis LDL557 which can alleviate at least one of the drawbacks of the prior art.

The isolated strain of Lactobacillus delbrueckii subsp. lactis LDL557 is deposited at Deutsche Sammlung von Mikroorganismen and Zellkulturen GmbH under an accession number DSM 33617.

In a second aspect, the present disclosure provides a composition, which can alleviate at least one of the drawbacks of the prior art, and which includes the aforesaid isolated strain of Lactobacillus delbrueckii subsp. lactis LDL557.

In a third aspect, the present disclosure provides a method for alleviating an inflammation-related disorder, which can alleviate at least one of the drawbacks of the prior art, and which includes administering to a subject in need thereof the aforesaid composition.

In a fourth aspect, the present disclosure provides use of the aforesaid isolated strain of Lactobacillus delbrueckii subsp. lactis LDL557 in the manufacture of a medicament or a food product for alleviating an inflammation-related disorder in a subject. Such use can alleviate at least one of the drawbacks of the prior art.

In a fifth aspect, the present disclosure provides the aforesaid isolated strain of Lactobacillus delbrueckii subsp. lactis LDL557 for use in alleviating an inflammation-related disorder in a subject. The strain for such use can alleviate at least one of the drawbacks of the prior art.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
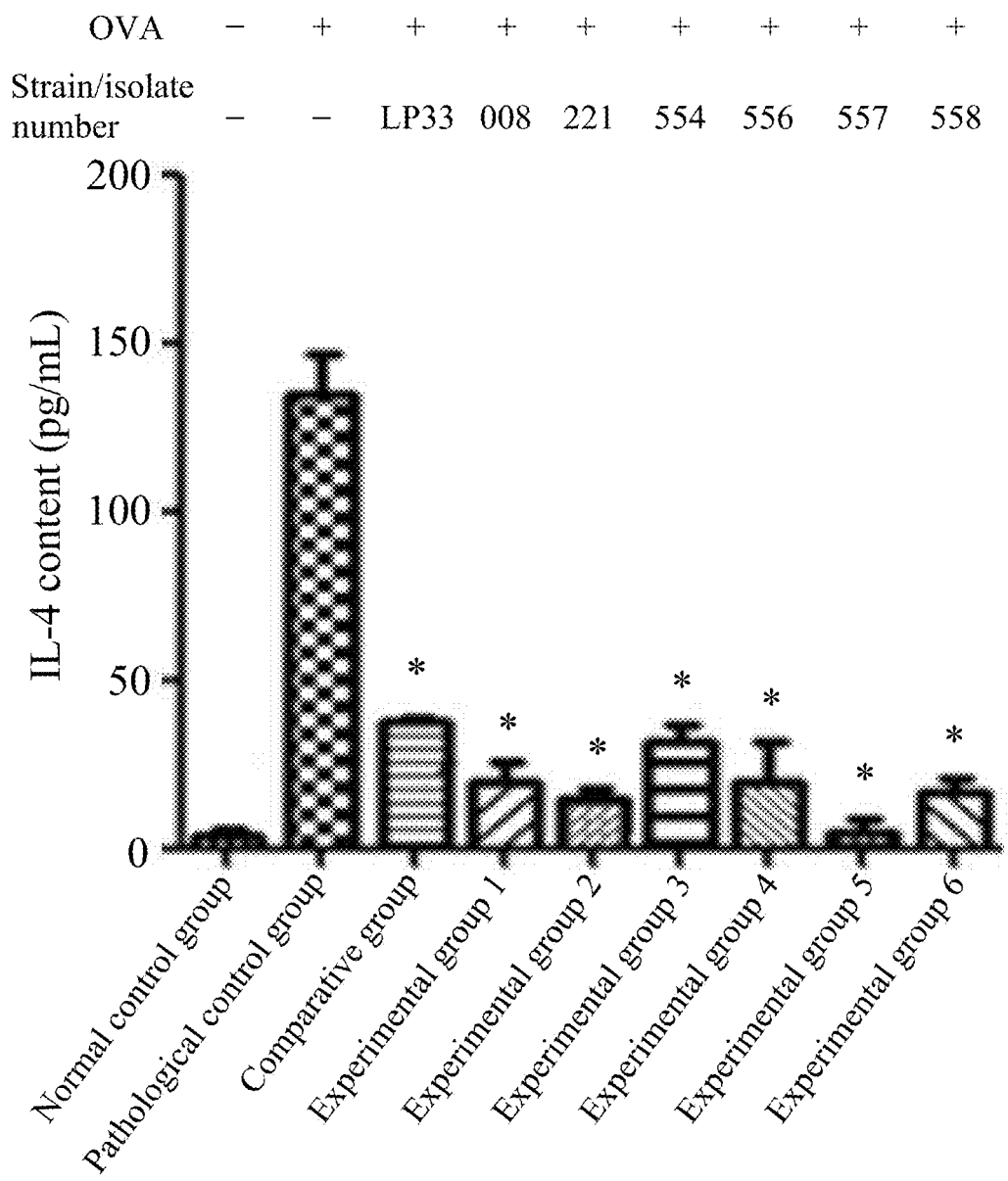
FIG. 1 shows the interleukin-4 (IL-4) content in each group of Example 2, infra, in which the symbol "*" represents $p<0.05$ (compared with the pathological control group)
Figure 2:
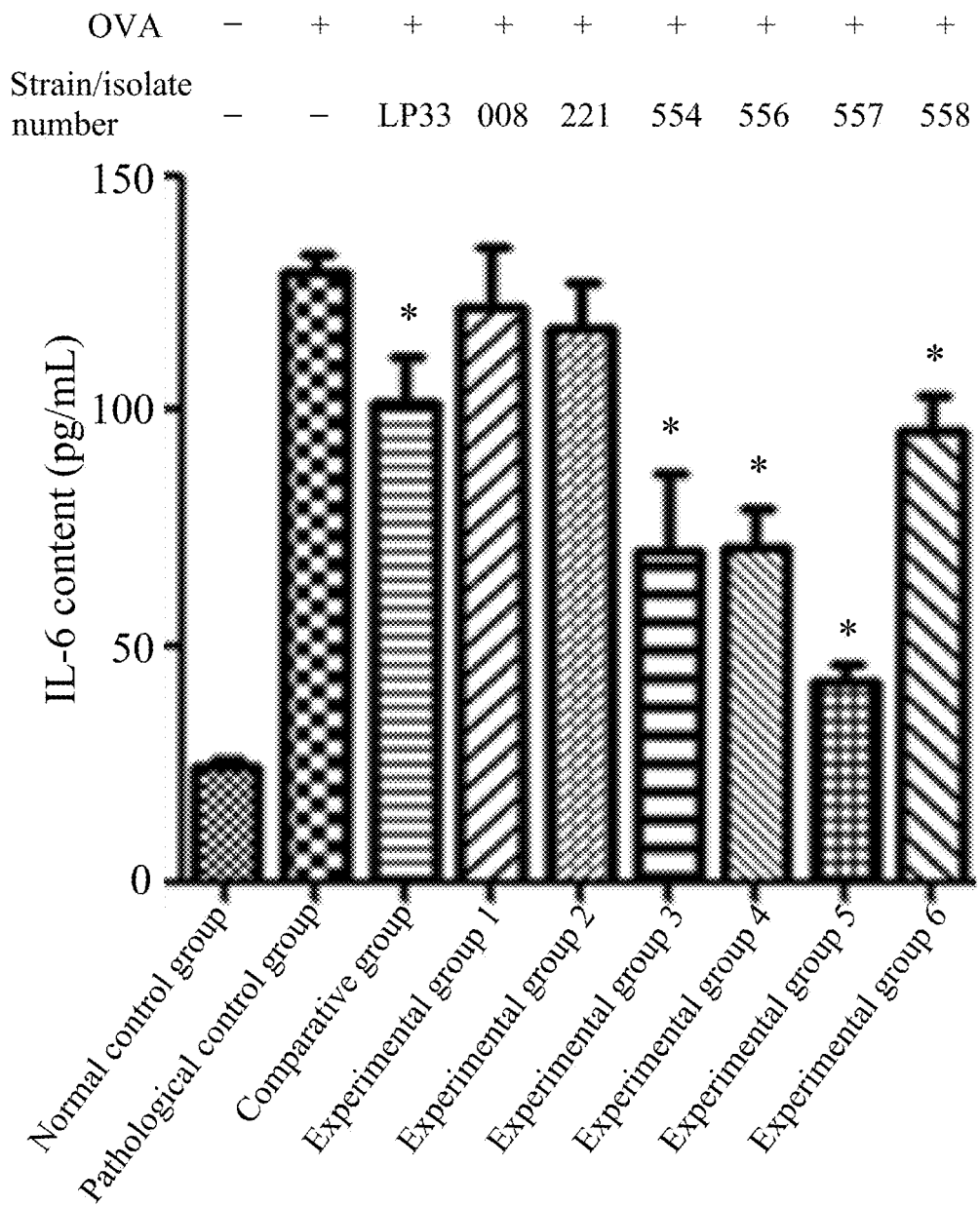
FIG. 2 shows the IL-6 content in each group of Example 2, infra, in which the symbol "*" represents $p<0.05$ (compared with the pathological control group)
Figure 3:
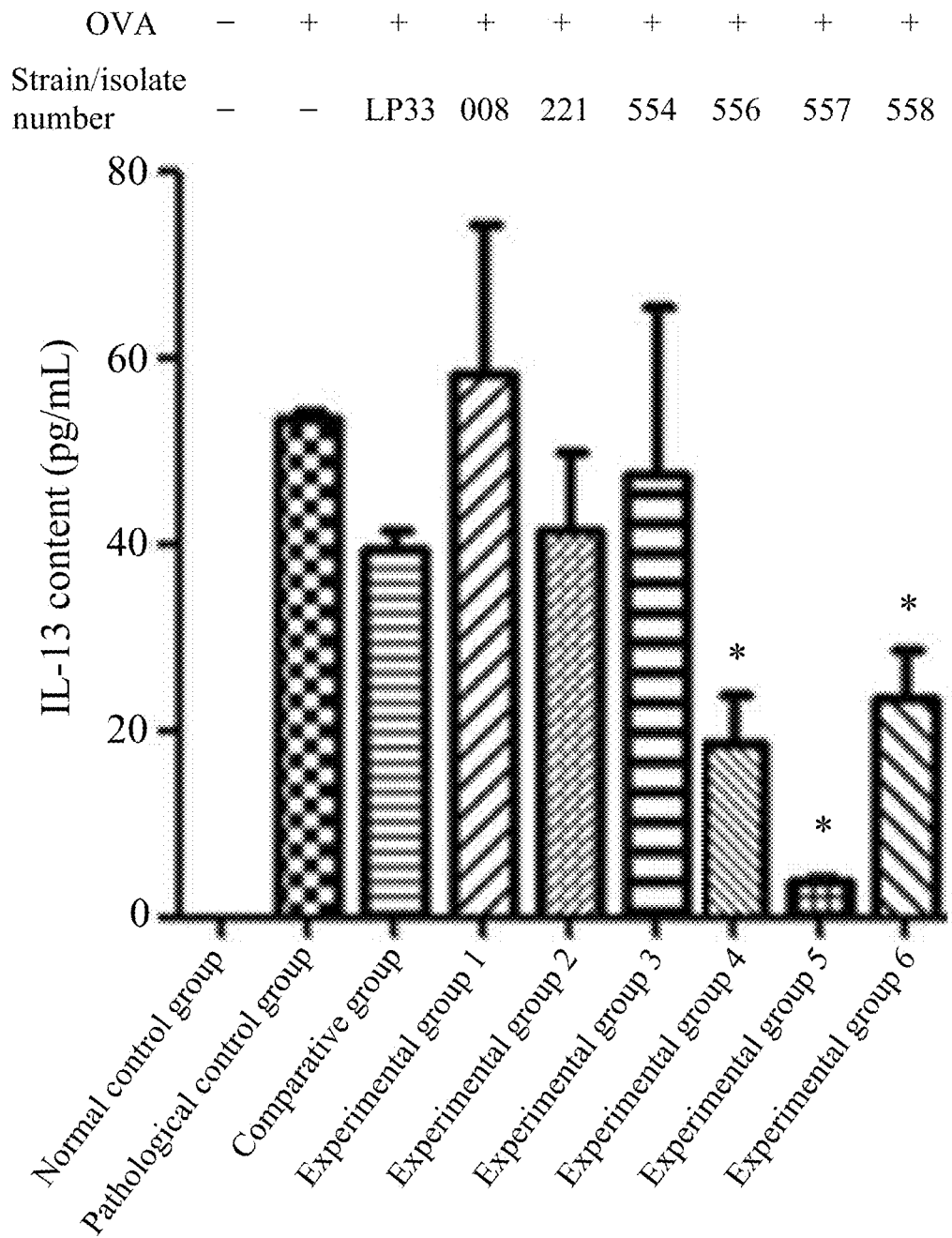
FIG. 3 shows the IL-13 content in each group of Example 2, infra, in which the symbol "*" represents $p<0.05$ (compared with the pathological control group)
Figure 4:
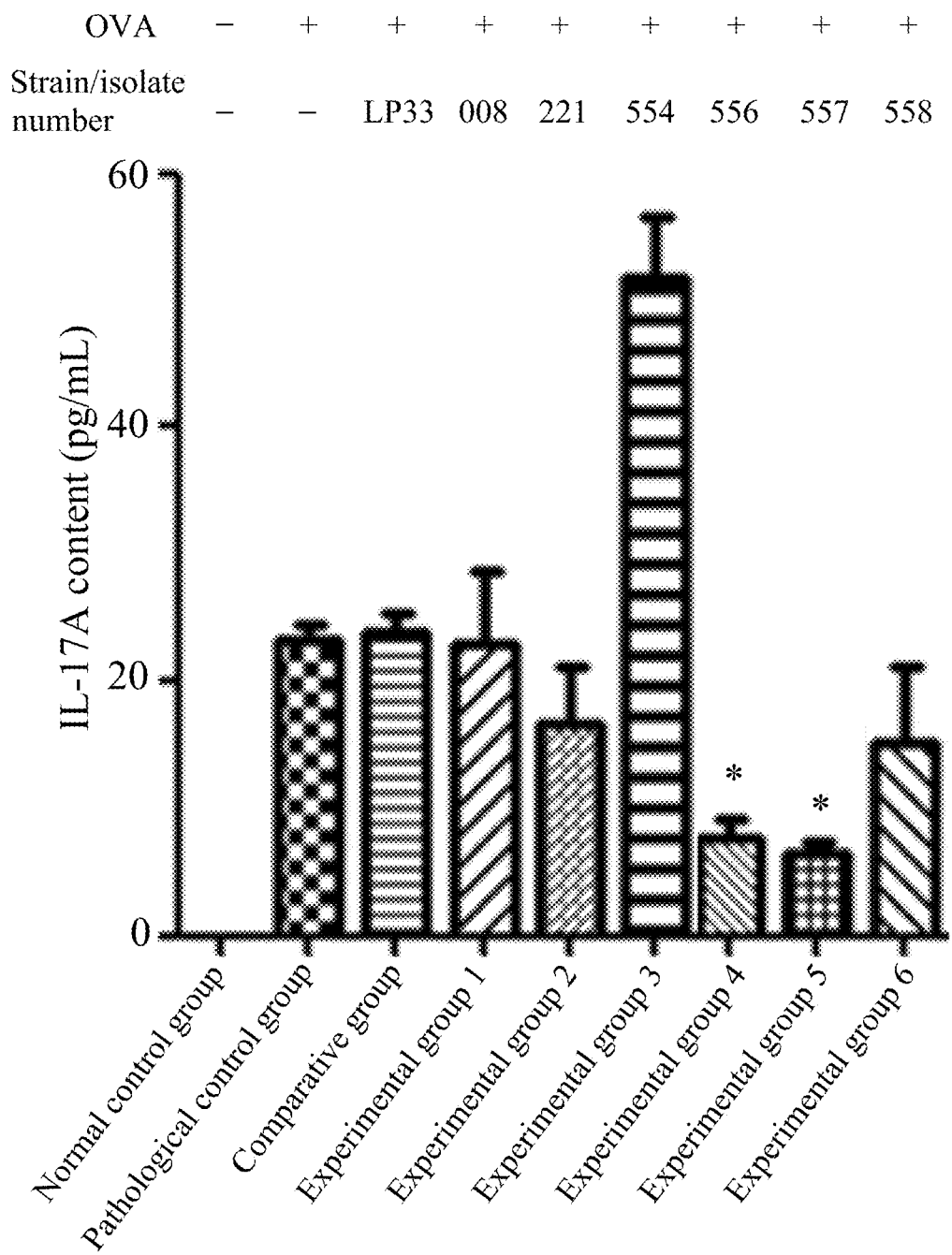
FIG. 4 shows the IL-17A content in each group of Example 2, infra, in which the symbol "*" represents $p<0.05$ (compared with the pathological control group)

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

The present disclosure provides an isolated strain of *Lactobacillus delbrueckii* subsp. *lactis* LDL557, which has been deposited at the Biosource Collection and Research Center (BCRC) of the Food Industry Research and Development Institute (FIRDI), Taiwan under an accession number BCRC 910780 since May 17, 2017, and which has also been deposited at the Deutsche Sammlung von Mikroorganismen and Zellkulturen (DSMZ) GmbH under an accession number DSM 33617 since Aug. 10, 2020 in accordance with the Budapest Treaty.

According to the present disclosure, the isolated strain of *Lactobacillus delbrueckii* subsp. *lactis* LDL557 may be live cells or dead cells, concentrated or non-concentrated, a liquid, a paste, a semi-solid, a solid (e.g., a pellet, a granule, or a powder), and may be heat-inactivated, frozen, dried, or freeze-dried (e.g., may be in freeze-dried form or spray/fluid bed dried form). In an exemplary embodiment, the isolated strain of *Lactobacillus delbrueckii* subsp. *lactis* LDL557 is heat-inactivated, and is present in the form of dead cells. In another exemplary embodiment, the isolated strain of *Lactobacillus delbrueckii* subsp. *lactis* LDL557 is present in the form of live cells.

The present disclosure also provides a composition, which includes the aforesaid isolated strain of *Lactobacillus delbrueckii* subsp. *lactis* LDL557. The composition may be used for alleviating an inflammation-related disorder.

As used herein, the term "alleviating" or "alleviation" refers to at least partially reducing, ameliorating, relieving, controlling, treating or eliminating one or more clinical signs of a disease or disorder; and lowering, delaying, stopping or reversing the progression of severity regarding the condition or symptom being treated and preventing or decreasing the likelihood or probability thereof.

As used herein, the terms "inflammation-related disorder" and "immune-related disorder" can be used interchangeably.

According to the present disclosure, the inflammation-related disorder may be selected from the group consisting of allergy (e.g., allergic rhinitis), asthma, arthritis, psoriasis, atopic dermatitis, systemic lupus erythematosus, inflammatory bowel disease (IBD) (e.g., colitis and Crohn's disease), and combinations thereof.

In certain embodiments, the composition of the present disclosure may be formulated as a food product using a standard technique well known to one of ordinary skill in the art. For example, the composition may be directly added to an edible material or may be used to prepare an intermediate composition (e.g., a food additive or a premix) suitable to be subsequently added to the edible material.

As used herein, the term "food product" refers to any article or substance that can be ingested by a subject into the body thereof. Examples of the food product may include, but are not limited to, fluid milk products (e.g., milk and concentrated milk), fermented milk (e.g., yogurt, sour milk, and frozen yogurt), milk powder, butter, beverages (e.g., tea and coffee), functional beverages, flour products, baked foods, confectionery, candies, health foods, animal feeds, and dietary supplements.

In addition, the composition of the present disclosure may be prepared in the form of a pharmaceutical composition.

According to the present disclosure, the pharmaceutical composition may be formulated into a suitable dosage form for parenteral, oral, topical or inhalation administration using technology well known to those skilled in the art. The suitable dosage form includes, but is not limited to, injections (e.g., sterile aqueous solutions or dispersions), sterile powder, tablets, troches, lozenges, pellets, capsules, dispersible powder or granules, solutions, suspensions, emulsions, drops, syrup, elixirs, slurry, sprays (e.g., nasal sprays or oral sprays), external preparations (e.g., ointments, creams, lotions, gels, and foams), and the like.

According to the present disclosure, the pharmaceutical composition may be administered by parenteral routes selected from the group consisting of intraperitoneal injection, intrapleural injection, intramuscular injection, intravenous injection, intraarterial injection, intraarticular injection, intrasynovial injection, intrathecal injection, intracranial injection, intraepidermal injection, subcutaneous injection, intradermal injection, intralesional injection, and sublingual administration.

According to the present disclosure, the pharmaceutical composition may be administered by inhalation routes selected from the group consisting of oral inhalation and nasal inhalation. In certain embodiments, the pharmaceutical composition may be formulated into a suitable dosage form for nasal inhalation.

The pharmaceutical composition may further include a pharmaceutically acceptable carrier widely employed in the art of drug-manufacturing. For instance, the pharmaceutically acceptable carrier may include one or more of the following agents: solvents, buffers, emulsifiers, suspending agents, decomposers, disintegrating agents, dispersing agents, binding agents, excipients, stabilizing agents, anticaking agents, chelating agents, diluents, gelling agents, preservatives, fillers, wetting agents, lubricants, absorption delaying agents, liposomes, and the like. The choice and amount of the aforesaid agents are within the expertise and routine skills of those skilled in the art.

The present disclosure provides a method for alleviating an inflammation-related disorder, which includes administering to a subject in need thereof the aforesaid composition.

As used herein, the term "administering" or "administration" means introducing, providing or delivering a predetermined active ingredient to a subject by any suitable routes to perform its intended function.

As used herein, the term "subject" refers to any mammal or poultry of interest, such as humans, monkeys, cows, sheep, horses, pigs, goats, dogs, cats, mice, rats, chickens, ducks, geese, and pigeons. In certain embodiments, the subject is a human.

The present disclosure also provides use of the aforesaid composition in the manufacture of a medicament or a food product for alleviating an inflammation-related disorder in a subject.

Moreover, the present disclosure provides the aforesaid isolated strain of *Lactobacillus delbrueckii* subsp. *lactis* LDL557 for use in alleviating an inflammation-related disorder in a subject.

The dose and frequency of administration of the composition of the present disclosure may vary depending on the following factors: the severity of the illness or disorder to be treated, routes of administration, and age, physical condition and response of the subject to be treated. In general, the composition may be administered in a single dose or in several doses.

The present disclosure will be further described by way of the following examples. However, it should be understood that the following examples are intended solely for the purpose of illustration and should not be construed as limiting the present disclosure in practice.

EXAMPLES

General Experimental Materials:

1. MRS (De Man, Rogosa and Sharpe) broth medium (Cat. No. 288130, BD Difco) used in the following experiments was purchased from Creative Life Science Co., Ltd., Taiwan.

2. MRS agar medium used in the following experiments was prepared by adding 1.5% agar to MRS broth medium.

3. Preparation of human peripheral blood mononuclear cells (human PBMCs)

Blood samples were collected from healthy human volunteers, and an acid citrate dextrose (ACD) solution was used as an anticoagulant. The blood samples were subjected to density gradient centrifugation (900 g, 30 minutes) at 4° C. with density gradient cell separation medium (i.e., Histopaque®-1077) (Cat. No. 10771, Sigma-Aldrich). Thereafter, the lymphocyte layer was harvested, followed by adding a red blood cell (RBC) lysis buffer. After centrifugation at 2000 rpm and 4° C. for 10 minutes, the RBC debris was removed, so as to obtain human PBMCs, and the cell concentration was adjusted to $2\times10^6$ cells/mL using an RPMI 1640 medium (Gibco) containing 10% fetal bovine serum (FBS).

4. Preparation of ovalbumin (OVA) emulsion

20 μg of OVA (Cat. No. A5503, Sigma-Aldrich) was dissolved in 200 μL of an aluminum hydroxide suspension (i.e., Imject™ Alum adjuvant) (Cat. No. 77161, Thermo Fisher Scientific), so as to prepare an OVA emulsion.

5. Experimental Animals

Female BALB/c mice, female C57BL/6 mice, and female Sprague-Dawley (SD) rats used in the following experiments were purchased from BioLasco Taiwan Co., Ltd. All the experimental animals were housed in an animal room under the following laboratory conditions: an alternating 12-hour light and 12-hour dark cycle, a temperature maintained at 22° C. to 25° C., and a relative humidity maintained at 40% to 60%. Furthermore, water and feed were provided ad libitum for all the experimental animals. All experiments on animals were approved by the Experimental Ethics Committee of the Livestock Research Institute of the Council of Agriculture, Taiwan, and were conducted according to the Guide for the Care and Use of Laboratory Animals of National Institute of Health (NIH).

General Procedures:

1. Statistical Analysis

The experimental data are expressed as mean±standard deviation (SD). All the data were analyzed using one-way analysis of variance (ANOVA) followed by Duncan's multiple range test, so as to evaluate the differences between the groups. Statistical significance is indicated by $p<0.05$.

Example 1. Preliminary Screening of Lactic Acid Bacteria (LAB) Isolates Having Anti-Inflammatory Activity A. Source and Isolation of Tested Strains Corn silage purchased from Taiwan Dairy Farm (Tainan, Taiwan) was used as a sample source. First, the corn silage was mixed with a 0.85% saline solution, followed by homogenization with a homogenizer (Oster 6642). The resultant homogenized mixture was subjected to serial dilution with a 0.85% saline solution, so as to obtain six dilutions (prepared using dilution factors of $10^2$, $10^3$, $10^4$, $10^5$, $10^6$, and $10^7$). 0.1 mL of a respective one of the six dilutions was evenly spread onto MRS agar medium, and was then cultured at 37° C. for 48 hours.

Fifteen LAB isolates were randomly selected from the MRS agar medium, and were designated as 008, 384, 221, 542, 544, 548, 553, 554, 555, 556, 557, 558, 561, 564, and 565, respectively. These isolates were subjected to the following analyses.

B. Preparation of Heat-Killed Bacterial Suspension of LAB Isolate

A respective one of the fifteen LAB isolates obtained in section A of this example was inoculated in an amount of 1% (v/v) into 9 mL of MRS broth medium, and was then cultured at 37° C. for 16 hours to 18 hours. After centrifugation at 3,500 rpm for 10 minutes, the resultant cell pellet was collected, and was washed with phosphate-buffered saline (PBS), followed by suspending in PBS, so as to obtain a bacterial suspension having a bacterial concentration of $10^9$ CFU/mL. The respective resultant bacterial suspension was subjected to a heat-killing treatment at 100° C. for 30 minutes, thereby obtaining a heat-killed bacterial suspension. The fifteen heat-killed bacterial suspensions thus obtained were used for the following experiment.

C. Screening of LAB Isolates Able to Stimulate Secretion of Interleukin-10 (IL-10) and Interferon-γ (IFN-γ) by Human PBMCs The human PBMCs prepared in section 3 of "General Experimental Materials" were divided into 16 groups, including one control group and fifteen experimental groups (i.e., experimental groups 1 to 15). Each group of the human PBMCs was incubated in a respective well of a 24-well culture plate containing 1 mL of an RPMI 1640 medium (supplemented with 10% FBS) at $2\times10^6$ cells/well, followed by cultivation in an incubator (37° C., 5% $CO_2$) for 24 hours. Afterwards, each of the cell cultures of the fifteen experimental groups was treated with 100 μL of the respective heat-killed bacterial suspension prepared in section B of this example. The cell culture of the control group received no treatment.

After cultivation in an incubator (37° C., 5% $CO_2$) for 24 hours, the respective resultant cell culture was subjected to centrifugation at 3,000 rpm for 15 minutes. The resultant supernatant was collected, and was then subjected to determination of IL-10 and IFN-γ contents using an IFN-γ enzyme-linked immunosorbent assay (ELISA) kit (Cat. No. 88-7316, eBioscience Inc.) and an IL-10 ELISA kit (Cat. No. 88-7106, eBioscience Inc.) in accordance with the manufacturer's instructions.

As shown in Table 1 below, the IFN-γ contents determined in the experimental groups 1, 3, 8, and 11 to 12 were each not lower than 3,000 pg/mL, and the IFN-γ and IL-10 contents determined in the experimental group 10 were not lower than 1,000 pg/mL. According to these results, the Applicant selected LAB isolates 008, 221, 554, 556, 557, and 558 for further experimentation to evaluate the anti-allergic activities of these strains.

TABLE 1

| Group | Strain number of LAB isolate | IFN-γ content (pg/mL) | IL-10 content (pg/mL) |
|---|---|---|---|
| Control group | — | 6 ± 1 | 35 ± 6 |
| Experimental group 1 | 008 | 5832 ± 118 | 198 ± 1 |
| Experimental group 2 | 384 | 1705 ± 277 | 261 ± 4 |
| Experimental group 3 | 221 | 3219 ± 227 | 640 ± 35 |
| Experimental group 4 | 542 | 2606 ± 126 | 575 ± 58 |
| Experimental group 5 | 544 | 1773 ± 10 | 596 ± 22 |
| Experimental group 6 | 548 | 490 ± 150 | 1243 ± 2 |
| Experimental group 7 | 553 | 2444 ± 363 | 444 ± 26 |
| Experimental group 8 | 554 | 4596 ± 210 | 564 ± 20 |
| Experimental group 9 | 555 | 2445 ± 125 | 343 ± 12 |
| Experimental group 10 | 556 | 1080 ± 17 | 1587 ± 111 |
| Experimental group 11 | 557 | 3392 ± 407 | 1209 ± 116 |
| Experimental group 12 | 558 | 4349 ± 276 | 262 ± 8 |
| Experimental group 13 | 561 | 1503 ± 52 | 622 ± 2 |
| Experimental group 14 | 564 | 2796 ± 101 | 428 ± 3 |
| Experimental group 15 | 565 | 2168 ± 82 | 829 ± 24 |

Example 2. Screening of LAB Isolates Having In Vitro Anti-Allergic Activity

Materials:

A. Preparation of Heat-Killed Bacterial Suspension of *Lactobacillus paracasei* 33 (LP33)

A heat-killed bacterial suspension of *Lactobacillus paracasei* 33 (having a bacterial concentration of $10^9$ CFU/mL) was prepared according to the procedures described in the abovementioned section B of Example 1.

Methods:

The in vitro anti-allergic activity was analyzed using a method slightly modified from that described by Lee J. et al. (2013), *J. Microbiol. Biotechnol.*, 23:724-730. Briefly, the female BALB/c mice were divided into nine groups, including a normal control group, a pathological control group, a comparative group, and six experimental groups (i.e., experimental groups 1 to 6) (n=12 per group). The mice of the pathological control group, comparative group, and six experimental groups were intraperitoneally injected with the OVA emulsion prepared in section 4 of "General Experimental Materials" at a dose of 200 μL/mouse. The mice of the normal control group were intraperitoneally injected with PBS at a dose of 200 μL/mouse. The mice in each group was subjected to the once-a-week injection for a total period of 2 weeks.

After the 2-week experimental period, the mice in each group were anesthetized using $CO_2$, and were subsequently sacrificed. Thereafter, the spleen tissue was obtained from each mouse carcass, followed by grinding. Each group of the resultant milled spleen sample was incubated in a respective well of a 24-well culture plate containing a suitable amount of an RPMI 1640 medium (supplemented with 10% FBS), followed by cultivation in an incubator (37° C., 5% $CO_2$) for 24 hours.

Subsequently, each group of the spleen cells thus obtained was incubated in a respective well of a 24-well culture plate containing 1 mL of an RPMI 1640 medium (supplemented with 10% FBS and 100 μg/mL OVA) at $2\times10^6$ cells/well, followed by cultivation in an incubator (37° C., 5% $CO_2$) for 48 hours. Afterwards, each of the cell cultures of the experimental groups 1 to 6 was added with 100 μL of a respective one of the heat-killed bacterial suspensions of LAB isolates 008, 221, 554, 556, 557, and 558 prepared in the abovementioned section B of Example 1. In addition, the cell culture of the comparative group was added with 100 μL of the heat-killed bacterial suspension of *Lactobacillus paracasei* 33, and the cell cultures of the normal control group and pathological control group received no treatment.

The treating agents for all the groups are summarized in Table 2 below.

TABLE 2

| Group | Treating agent |
|---|---|
| Normal control group | — |
| Pathological control group | — |
| Comparative group | Heat-killed bacterial suspension of *Lactobacillus paracasei* 33 |
| Experimental group 1 | Heat-killed bacterial suspension of LAB isolate 008 |
| Experimental group 2 | Heat-killed bacterial suspension of LAB isolate 221 |
| Experimental group 3 | Heat-killed bacterial suspension of LAB isolate 554 |
| Experimental group 4 | Heat-killed bacterial suspension of LAB isolate 556 |
| Experimental group 5 | Heat-killed bacterial suspension of LAB isolate 557 |
| Experimental group 6 | Heat-killed bacterial suspension of LAB isolate 558 |

Each group was cultivated in an incubator (37° C., 5% $CO_2$) for 48 hours. After centrifugation at 3,000 rpm for 15 minutes, the resultant supernatant was collected, and was subjected to determination of IL-4, IL-6, IL-13, and IL-17A contents using an IL-4 ELISA kit (Invitrogen, Cat. No. BMS613TEN), an IL-6 ELISA kit (Invitrogen, Cat. No. 88-7064-88), an IL-13 ELISA kit (Invitrogen, Cat. No. 88-7137-86), and an IL-17A ELISA kit (Invitrogen, Cat. No. BMS6001TEN) in accordance with the manufacturer's instructions.

The data thus obtained were analyzed according to the method described in section 1 of "General Procedures".
Results:

Referring to FIGS. 1 to 4, the contents of IL-4, IL-6, IL-13, and IL-17A determined in the experimental group 5 were apparently or significantly lower than those determined in the experimental groups 1 to 4 and 6, the comparative group, and the pathological control group, indicating that LAB isolate 557 had the best in vitro anti-allergic activity.

Therefore, LAB isolate 557 showed more potential for development, and was subjected to characteristic analysis described below.

Example 3. Characteristic Analysis of LAB Isolate 557

In order to identify the bacterial species of LAB isolate 557, the following preliminary characteristic determination, 16S rDNA sequence analysis, and carbohydrate fermentation profiling were conducted.

A. Preliminary Tests

Items of the preliminary tests conducted for LAB isolate 557 include: gram staining, morphological observation, mobility, catalase test, growth under aerobic and anaerobic conditions, and ability to produce an endospore.

The results of the aforesaid preliminary tests indicate that LAB isolate 557 is gram-positive, non-motile, catalase-negative, grows under anaerobic conditions, and non-endospore forming.

B. 16S rDNA Sequence Analysis

Genomic DNA of LAB isolate 557 was extracted using Genomic DNA Mini Kit (Geneaid Biotech Ltd., Cat. No. GB300). The thus obtained genomic DNA was used as a template and was subjected to polymerase chain reaction (PCR) that was performed using a designed primer pair specific for 16S ribosomal DNA (rDNA) and the reaction conditions shown in Table 3, thereby obtaining a PCR product having a size of approximately 474 bp.

TABLE 3

| Contents | | Volume (μL) |
|---|---|---|
| Genomic DNA of LAB isolate 557 (10 ng) | | 1 |
| 16S rDNA-specific primer pair | Forward primer 27F (10 μM): 5'-agagtttgatcctggctcag-3' (SEQ ID No: 1) | 0.5 |
| | Reverse primer 1492R (10 μM): 5'-ggttaccttgttacgact-3' (SEQ ID No: 2) | 0.5 |
| dNTPs (10 mM) | | 0.5 |
| 10X buffer | | 2.5 |
| Tag DNA polymerase (5 U/μL) | | 0.5 |
| dd$H_2O$ | | 18.5 |

Operation conditions: denaturation at 94° C. for 5 min, followed by 30 cycles of the following reactions: denaturation at 95° C. for 60 sec, primer annealing at 50° C. for 60 sec, and extension at 72° C. for 60 sec; and lastly, elongation at 72° C. for 8 min.

The resultant PCR product was subjected to 2% agarose gel electrophoresis analysis for molecular weight verification.

Thereafter, the PCR product was verified by sequencing analysis which was entrusted to Genomics BioSci & Tech Co., Ltd., Taiwan, so as to obtain the 16S rDNA sequence (SEQ ID No: 3) of LAB isolate 557. Through comparison with the data in the NCBI's gene database, it was found that the 16S rDNA sequence of LAB isolate 557 is most homologous to that of *Lactobacillus delbrueckii* subsp. *lactis*.

In view of the aforesaid experimental results, LAB isolate 557 of the present disclosure is identified as *Lactobacillus delbrueckii* subsp. *lactis*. In order to confirm whether *Lactobacillus delbrueckii* subsp. *lactis* strain LDL557 (i.e. LAB isolate 557) is a novel *Lactobacillus delbrueckii* subsp. *lactis* strain, the following experiment was conducted.

B. Carbohydrate Fermentation Profiling
B. Carbohydrate fermentation profiling

The carbohydrate fermentation profile of *Lactobacillus delbrueckii* subsp. *lactis* strain LDL557 was determined using an API (analytical profile index) test strip (i.e., API® 50 CHL identification system (bioMérieux)). The result is shown in Table 4 below.

TABLE 4

| Carbohydrate | Capability of fermenting carbohydrate tested to produce acid |
|---|---|
| Glycerol | − |
| Erythritol | − |
| D-Arabinose | − |
| L-Arabinose | − |
| D-Ribose | − |
| D-Xylose | − |
| L-Xylose | − |
| D-Adonitol | − |
| Methyl-β-D-xylopyranoside | − |
| D-Galactose | − |
| D-Glucose | + |
| D-Fructose | + |
| D-Mannose | − |
| L-Sorbose | − |
| L-Rhamnose | − |
| Dulcitol | − |

TABLE 4-continued

| Carbohydrate | Capability of fermenting carbohydrate tested to produce acid |
|---|---|
| Inositol | − |
| D-Mannitol | − |
| D-Sorbitol | − |
| Methyl-α-D-mannopyranoside | − |
| Methyl-α-D-glucopyranoside | − |
| N-Acetylglucosamine | + |
| Amygdalin | − |
| Arbutin | − |
| Esculin | − |
| Salicin | − |
| D-Lactose | + |
| D-Melibiose | − |
| D-Saccharose | − |
| D-Trehalose | + |
| Inulin | − |
| D-Melezitose | − |
| D-Raffinose | − |
| Amidon | − |
| Glycogen | − |
| Xylitol | − |
| Gentiobiose | − |
| D-Turanose | − |
| D-Lyxose | − |
| D-Tagatose | − |
| D-Fucose | − |
| L-Fucose | − |
| D-Arabitol | − |
| L-Arabitol | − |
| Gluconate | − |
| 2-Ketogluconate | − |
| 5-Ketogluconate | − |

Note:
"+" indicates that *Lactobacillus delbrueckii* subsp. *lactis* strain LDL557 is capable of fermenting the carbohydrate tested to produce an acid, whereas "−" indicates that the strain has no such capability.

The aforesaid result was subjected to comparison with the data in the on-line bacteria and yeast database (APIWEB™ software), and it was found that the carbohydrate fermentation profile of *Lactobacillus delbrueckii* subsp. *lactis* strain LDL557 of the present disclosure has 84.9% identity to that of *Lactobacillus delbrueckii* subsp. *lactis*, suggesting that the *Lactobacillus delbrueckii* subsp. *lactis* strain LDL557 characterized thus far by the applicant is different from conventionally known strains of *Lactobacillus delbrueckii* subsp. *lactis*.

Based on the aforementioned characterization results, the applicant believes that the *Lactobacillus delbrueckii* subsp. *lactis* strain LDL557 is a novel strain of *Lactobacillus delbrueckii* subsp. *lactis*. As such, *Lactobacillus delbrueckii* subsp. *lactis* strain LDL557 has been deposited at the Biosource Collection and Research Center (BCRC) of the Food Industry Research and Development Institute (FIRDI), Taiwan under an accession number BCRC 910780 since May 17, 2017, and has also been deposited at the Deutsche Sammlung von Mikroorganismen and Zellkulturen (DSMZ) GmbH under an accession number DSM 33617 since Aug. 10, 2020 in accordance with the Budapest Treaty.

Example 4. Evaluation of the Ability of *Lactobacillus delbrueckii* Subsp. *lactis* LDL557 to Stimulate Secretion of IL-6 and IL-10 by Macrophages A. Preparation of Heat-Killed Bacterial Suspension of *Lactobacillus delbrueckii* Strain A respective one of *Lactobacillus delbrueckii* subsp. *lactis* LDL557 of the present disclosure and eleven comparative strains of *Lactobacillus delbrueckii* subspecies screened by the applicant (as shown in Table 5) was subjected to the procedures described in the abovementioned section B of Example 1, so as to obtain twelve heat-killed bacterial suspensions (each of the bacterial suspensions had a bacterial concentration of $10^8$ CFU/mL). The resultant heat-killed bacterial suspensions were subjected to the following experiments.

TABLE 5

| Isolated strain of *Lactobacillus delbrueckii* subspecies | Number |
|---|---|
| *Lactobacillus delbrueckii* subsp. *bulgaricus* | 45 |
| | 51 |
| | 119 |
| | 242 |
| *Lactobacillus delbrueckii* subsp. *lactis* | 243 |
| | 114 |
| | 546 |
| | 1214 |
| | $1019^T$ |
| *Lactobacillus delbrueckii* subsp. *delbrueckii* | $1067^T$ |
| *Lactobacillus delbrueckii* subsp. *jakobsenii* | $1072^T$ |

B. Determination of Contents of IL-6 and IL-10

Human acute monocytic leukemia cell line THP-1 (BCRC 60430) was purchased from the BCRC of the FIRDI (Taiwan). THP-1 cells were incubated in a respective well of a 24-well culture plate containing 1 mL of an RPMI 1640 medium (supplemented with 10% FBS and 10 ng/mL phorbol 12-myristate-13-acetate (PMA)) at $5 \times 10^5$ cells/well, followed by cultivation in an incubator (37° C., 5% $CO_2$) for 48 hours, so as to induce differentiation of THP-1 cells into macrophages.

Afterwards, the resultant cell cultures were divided into 12 groups, including one experimental group and eleven comparative groups (i.e., comparative groups 1 to 11). The culture medium in each well was removed. Subsequently, the cell culture of the experimental group was added with 900 μL of an RPMI 1640 medium and 100 μL of the heat-killed bacterial suspension of *Lactobacillus delbrueckii* subsp. *lactis* LDL557. In addition, each of the cell cultures of the eleven comparative groups was added with 900 μL of an RPMI 1640 medium and 100 μL of a respective one of the eleven heat-killed bacterial suspensions of the comparative strains of *Lactobacillus delbrueckii*.

Each group was cultivated in an incubator (37° C., 5% $CO_2$) for 24 hours. After centrifugation at 3,500 rpm for 15 minutes, the resultant supernatant was collected, and was then subjected to determination of IL-6 and IL-10 contents using an IL-6 ELISA kit (Cat. No. 88-7066-88, Invitrogen) and an IL-10 ELISA kit (Cat. No. 88-7106-88, Invitrogen) in accordance with the manufacturer's instructions.

Figure 5:
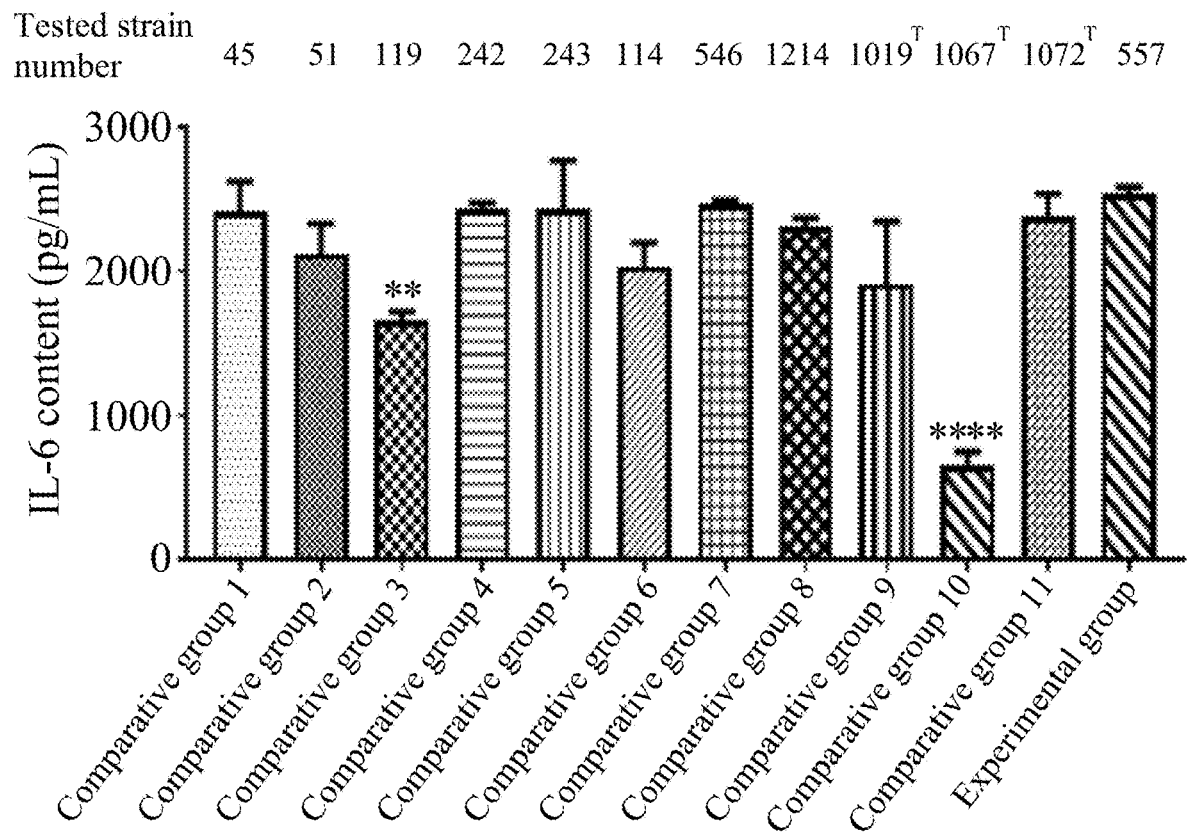
FIG. 5 shows the IL-6 content in each group of Example 4, infra, in which the symbols "" and "**" respectively represent $p<0.01$ and $p<0.0001$ (compared with the experimental group)
Figure 6:
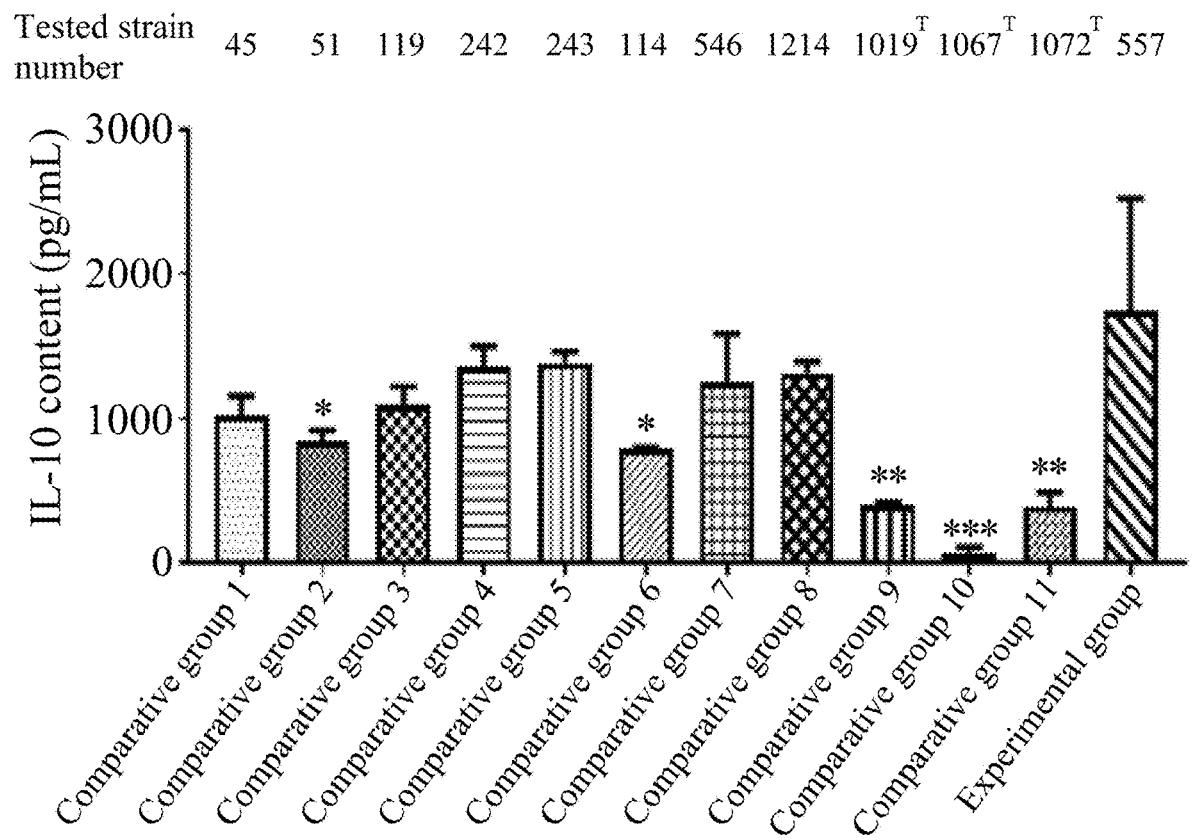
FIG. 6 shows the IL-10 content in each group of Example 4, infra, in which the symbols "*", "", and "*" respectively represent $p<0.05$, $p<0.01$, and $p<0.001$ (compared with the experimental group)

Referring to FIGS. 5 and 6, the contents of IL-6 and IL-10 determined in the experimental group were higher than those determined in the comparative groups 1 to 11, indicating that the ability of *Lactobacillus delbrueckii* subsp. *lactis* LDL557 to stimulate secretion of IL-6 and IL-10 from macrophages is better than that of other known strains of *Lactobacillus delbrueckii*.

Example 5. In Vivo Anti-Allergy Test on *Lactobacillus delbrueckii* Subsp. *lactis* LDL557

A. Preparation of Bacterial Suspensions of *Lactobacillus delbrueckii* Subsp. *lactis* LDL557 and *Lactobacillus rhamnosus* GG (LGG)

A respective one of *Lactobacillus delbrueckii* subsp. *lactis* LDL557 and LGG was inoculated in MRS broth, and was then cultured at 37° C. for 16 hours to 18 hours. After centrifugation at 5,000 rpm and 4° C. for 10 minutes, the respective resultant cell pellet was collected, and was washed with phosphate-buffered saline (PBS), followed by a freeze-drying treatment, so as to obtain a freeze-dried powder of *Lactobacillus delbrueckii* subsp. *lactis* LDL557 and a freeze-dried powder of LGG.

A respective one of the two freeze-dried powders was mixed with a suitable amount of a 0.85% physiological salt solution, so as to obtain a bacterial suspension having a bacterial concentration of $10^9$ CFU/mL. The respective one of the resultant bacterial suspensions was used for the following experiments.

B. Induction of Allergy and Administration of Bacterial Suspensions

The induction of allergy was conducted using a method slightly modified from that described by Lee J. et al. (2013), supra. Briefly, the female BALB/c mice (6 weeks old, with a body weight of approximately 19-20 g) were divided into four groups, including a normal control group, a pathological control group, a comparative group, and an experimental group (n=6 per group). The mice of the pathological control group, comparative group, and experimental group were intraperitoneally injected with the OVA emulsion prepared in section 4 of "General Experimental Materials" at a dose of 200 μL/mouse. The mice of the normal control group were intraperitoneally injected with Imject™ alum adjuvant (Cat. No. 77161, Thermo Fisher Scientific) at a dose of 200 μL/mouse. On the 14th day after the injection of the OVA emulsion or the Imject™ alum adjuvant, the mice in each group were injected once more in the same manner as described above.

Thereafter, the mice of the experimental group were fed, via oral gavage, with the bacterial suspension of *Lactobacillus delbrueckii* subsp. *lactis* LDL557 prepared in section A of this example at a dose of 9-10 log CFU/kg, and the mice of the comparative group were fed, via oral gavage, with the bacterial suspension of LGG prepared in section A of this example at a dose of 9-10 log CFU/kg. In addition, each of the mice of the normal control group and pathological control group was fed, via oral gavage, with 0.2 mL of a 0.85% sodium chloride solution. Each mouse was fed once daily for a 21-day treatment period.

C. Determination of IgA Content in Fecal Sample

After the 21-day treatment period, all the mice were sacrificed by virtue of 95% $CO_2$ asphyxiation, and the fecal sample was obtained from each mouse carcass. A suitable amount of PBS was added to the respective fecal sample to reach a final concentration of 100 mg/mL. The respective diluted fecal sample was subjected to determination of IgA content using an IgA ELISA kit (Cat. No. E90-103, Bethyl Laboratories Inc.) according to the manufacturer's instructions.

Figure 7:
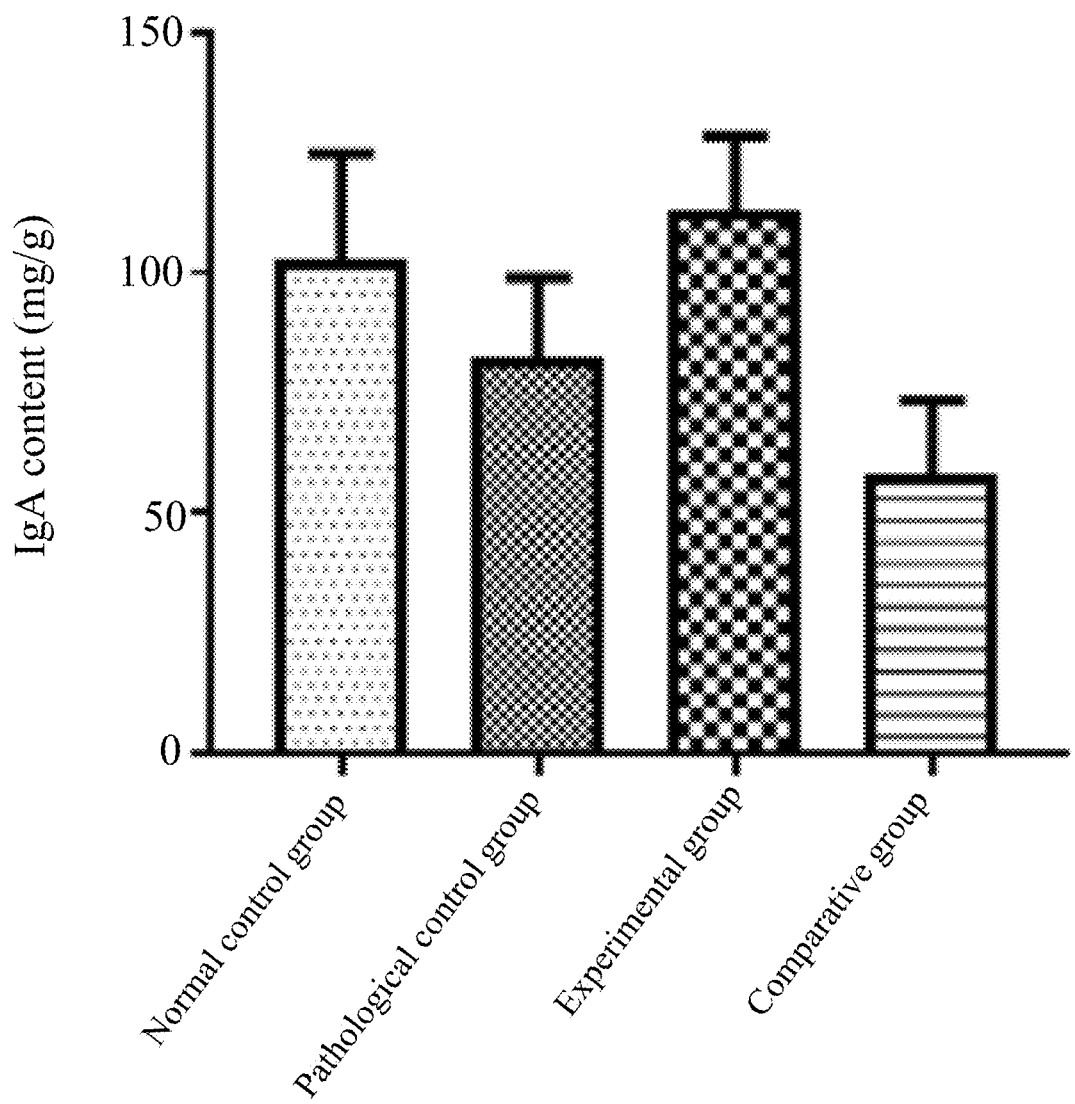
FIG. 7 shows the IgA content in each group of Example 5, infra.

Referring to FIG. 7, the IgA content determined in the experimental group was higher than those determined in the comparative group and the pathological control group. This result suggests that *Lactobacillus delbrueckii* subsp. *lactis* LDL557 of the present disclosure is effective in inducing IgA secretion, and hence can exhibit anti-allergic activity.

Example 6. In Vivo Anti-Asthma Test on *Lactobacillus delbrueckii* Subsp. *lactis* LDL557

A. Preparation of Emulsion Containing *Dermatophagoides pteronyssinus* (DerP)

DerP (Allergon, Sweden) was subjected to an ultrasonic vibration treatment. 50 μg of the resultant Derp powder was dissolved in 200 μL of Imject™ Alum adjuvant (Cat. No. 77161, Thermo Fisher Scientific), so as to prepare a Derp emulsion.

B. Induction of Asthma and Administration of Bacterial Suspensions

The female BALB/c mice (6 weeks old, with a body weight of approximately 18-22 g) were divided into six groups, including a normal control group, a pathological control group, a comparative group, and three experimental groups (i.e., experimental groups 1 to 3) (n=12 per group). The mice of the experimental group 1 were fed, via oral gavage, with the bacterial suspension of *Lactobacillus delbrueckii* subsp. *lactis* LDL557 prepared in section A of Example 5 at a dose of $5 \times 10^9$ CFU/kg, the mice of the experimental group 2 were fed, via oral gavage, with the bacterial suspension of *Lactobacillus delbrueckii* subsp. *lactis* LDL557 prepared in section A of Example 5 at a dose of $5 \times 10^{10}$ CFU/kg, and the mice of the experimental group 3 were fed, via oral gavage, with the heat-killed bacterial suspension of *Lactobacillus delbrueckii* subsp. *lactis* LDL557 prepared in section A of Example 4 at a dose of $5 \times 10^{10}$ CFU/kg. In addition, the mice of the comparative group were fed, via oral gavage, with dexamethasone at a dose of 1 mg/kg, and each of the mice of the normal control group and pathological control group was fed, via oral gavage, with 0.2 mL of a 0.85% physiological salt solution. Each mouse was fed once daily for a 30-day treatment period.

On the $14^{th}$ and $21^{st}$ days, after the treatment of the bacterial suspension, the physiological salt solution, or dexamethasone, the mice of the pathological control group, comparative group, and three experimental groups were intraperitoneally immunized with the Derp emulsion prepared in section A of this example at a dose of 100 μL/mouse. On the $22^{nd}$ day, after the treatment of the bacterial suspension, the physiological salt solution, or dexamethasone, the mice of the pathological control group, comparative group, and three experimental groups were intranasally instilled with the Derp emulsion prepared in section A of this example at a dose of 20 μL/mouse. Each mouse was intranasally instilled once daily for a total period of 5 days. On the 28th day, after the treatment of the bacterial suspension, the physiological salt solution, or dexamethasone, the mice of the pathological control group, comparative group, and three experimental groups were intratracheally instilled with the Derp emulsion prepared in section A of this example at a dose of 40 μL/mouse, so as to induce asthma. In addition, the mice of the normal control group received no Derp emulsion.

C. Determination of respiratory parameters

After the 30-day treatment period, each mouse was anesthetized by virtue of an anesthetic agent containing tiletamine and zolazepam (Zoletil®), followed by conducting tracheotomy. Thereafter, the respective mouse was intubated and ventilated using a FlexiVent instrument (SCIREQ Inc.), followed by causing methacholine-induced airflow obstruction in the respective mouse using increasing concentrations (0, 1, 2, 4, and 8 mg/mL) of aerosolized methacholine (Sigma-Aldrich, Cat. No. PHR1943). The respiratory system resistance (Rrs), respiratory system elastance (Ers), and tissue damping (G) of each mouse were determined at the different concentrations of aerosolized methacholine.

The data thus obtained were analyzed according to the method described in section 1 of "General Procedures".

Figure 8:
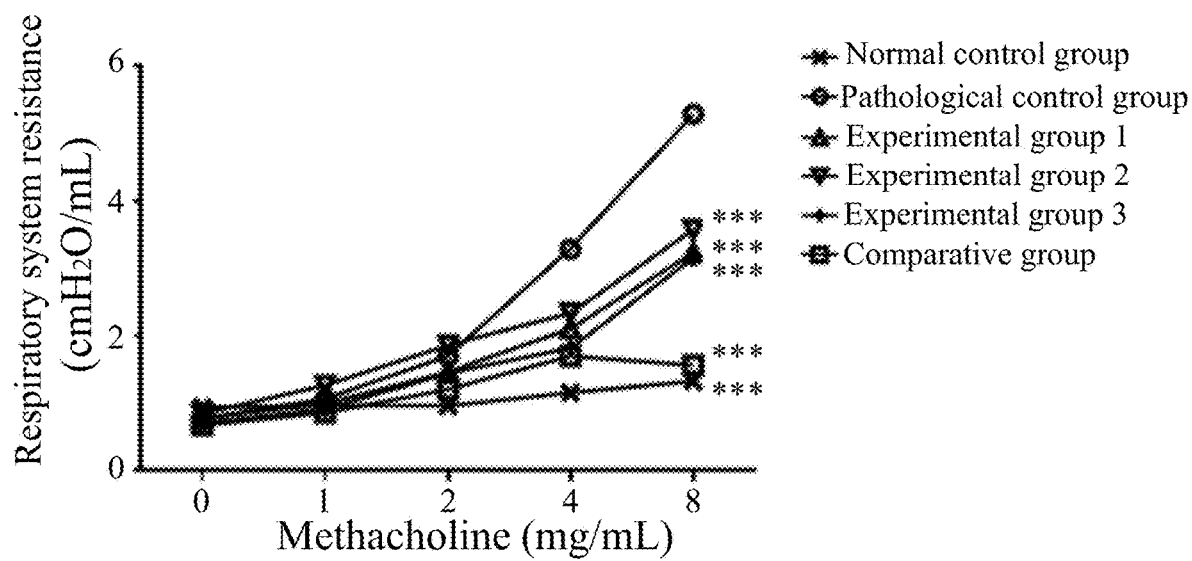
FIG. 8 shows the respiratory system resistance (Rrs) in each group of Example 6, infra, in which the symbol "***" represents $p<0.001$ (compared with the pathological control group)
Figure 9:
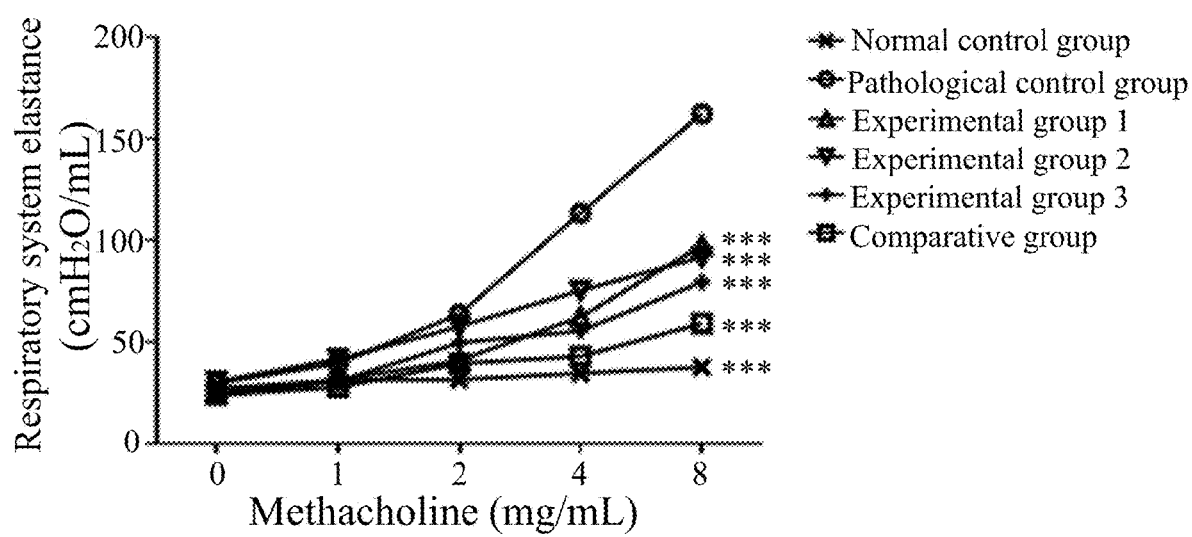
FIG. 9 shows the respiratory system elastance (Ers) in each group of Example 6, infra, in which the symbol "***" represents $p<0.001$ (compared with the pathological control group)
Figure 10:
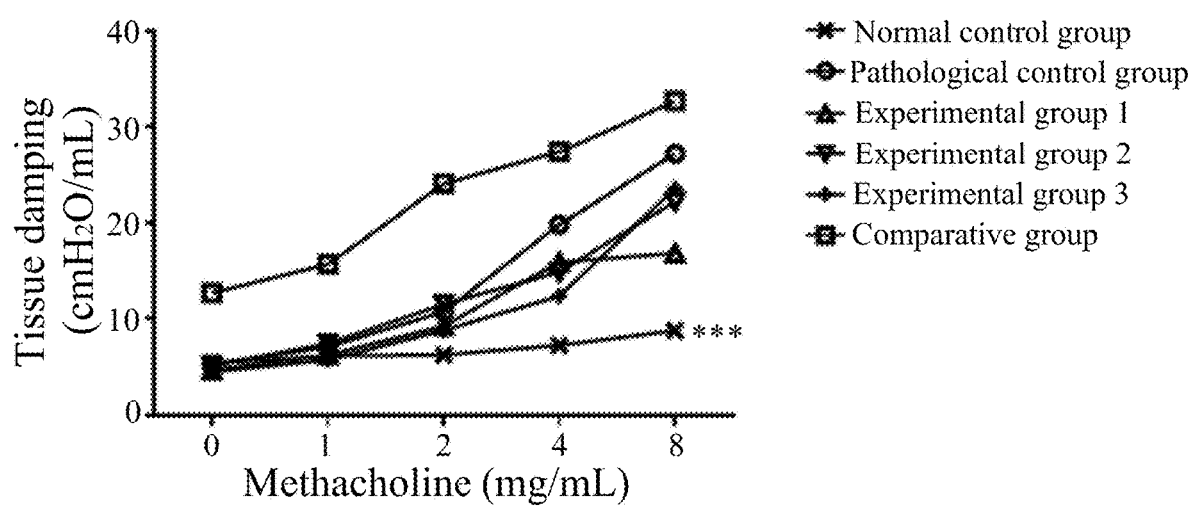
FIG. 10 shows the tissue damping (G) in each group of Example 6, infra, in which the symbol "***" represents $p<0.001$ (compared with the pathological control group)

Referring to FIGS. 8 to 10, the Rrs, Ers, and G determined in each of the experimental groups 1 to 3 were respectively lower than those determined in the pathological control group, indicating that *Lactobacillus delbrueckii* subsp. *lactis* LDL557 of the present disclosure, whether in the form of live cells or dead cells, can effectively alleviate airway obstruction.

D. Determination of IL-10 Content in Bronchoalveolar Lavage Fluid (BALF)

After completion of the lung function test as described in section C of this example, the respective mouse was sacrificed by virtue of 95% $CO_2$ asphyxiation. 2 mL of sterile saline was injected into the lung of the respective mouse using a bronchoscope, followed by collecting the BALF thus formed. After centrifugation at 300 g and 4° C. for 15 minutes, the resultant supernatant was collected, and was used as a BALF sample. 100 μL of the respective BALF sample was added to a corresponding well of a 96-well culture plate, and was then subjected to determination of IL-10 content using an IL-10 ELISA kit (Cat. No. DY417, R&D Systems Inc.).

The data thus obtained were analyzed according to the method described in section 1 of "General Procedures".

Figure 11:
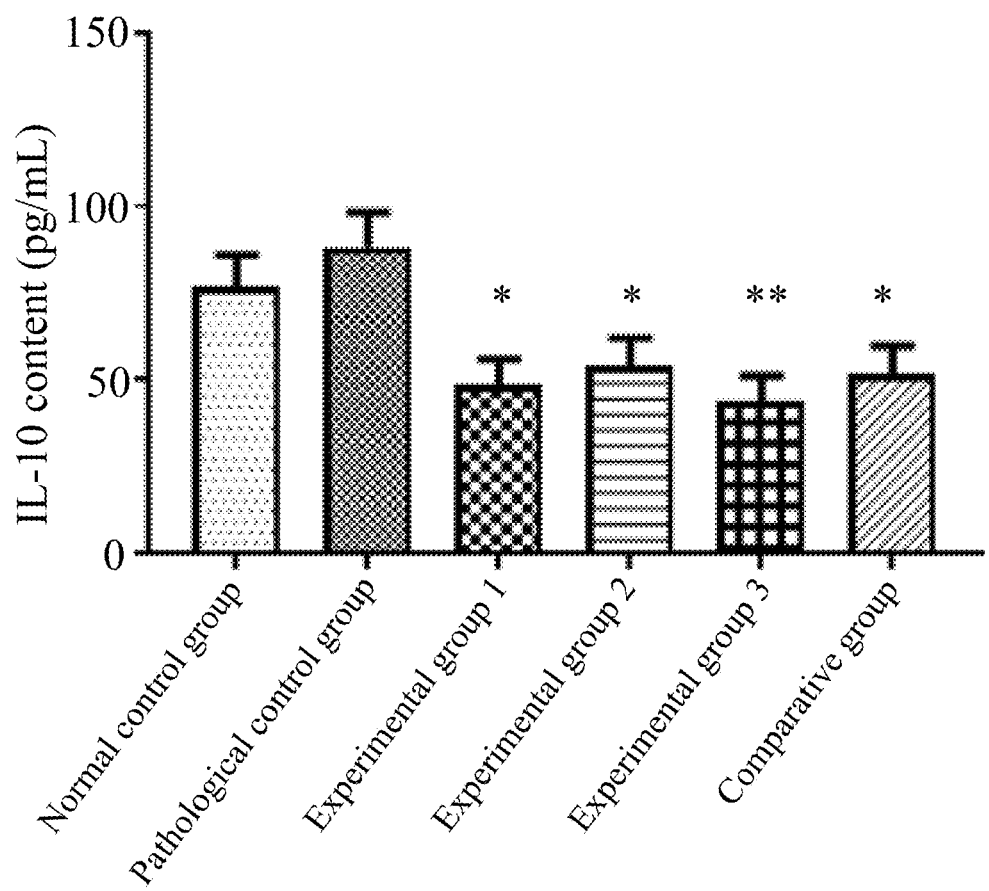
FIG. 11 shows the IL-10 content in each group of Example 6, infra, in which the symbols "*" and "**" respectively represent $p<0.05$ and $p<0.01$ (compared with the pathological control group)

Referring to FIG. 11, the IL-10 contents determined in the experimental groups 1 to 3 were each significantly lower than that determined in the pathological control group, indicating that *Lactobacillus delbrueckii* subsp. *lactis* LDL557 of the present disclosure, whether in the form of live cells or dead cells, can effectively alleviate airway inflammation.

E. Histopathologic Analysis

After completion of the determination of IL-10 content as described in section D of this example, the lung tissue was obtained from each mouse carcass, followed by fixation with a 10% paraformaldehyde solution (in PBS) at room temperature for 48 hours. The fixed tissue sample was then embedded with paraffin, followed by slicing to obtain a tissue section having a thickness of 5 μm.

The tissue section was stained with hematoxylin and eosin (H&E) using a staining protocol well-known to those skilled in the art, and was observed under an Olympus upright microscope equipped with a transmitted light source at 100× magnification. 144 areas of the respective tissue section were randomly selected and photographed, and the cellular infiltration index of each group was determined generally according to the method described in Sung J. E. et al. (2017), *Int. J. Mol. Med.*, 40:1365-1376.

The data thus obtained were analyzed according to the method described in section 1 of "General Procedures".

Figure 12:
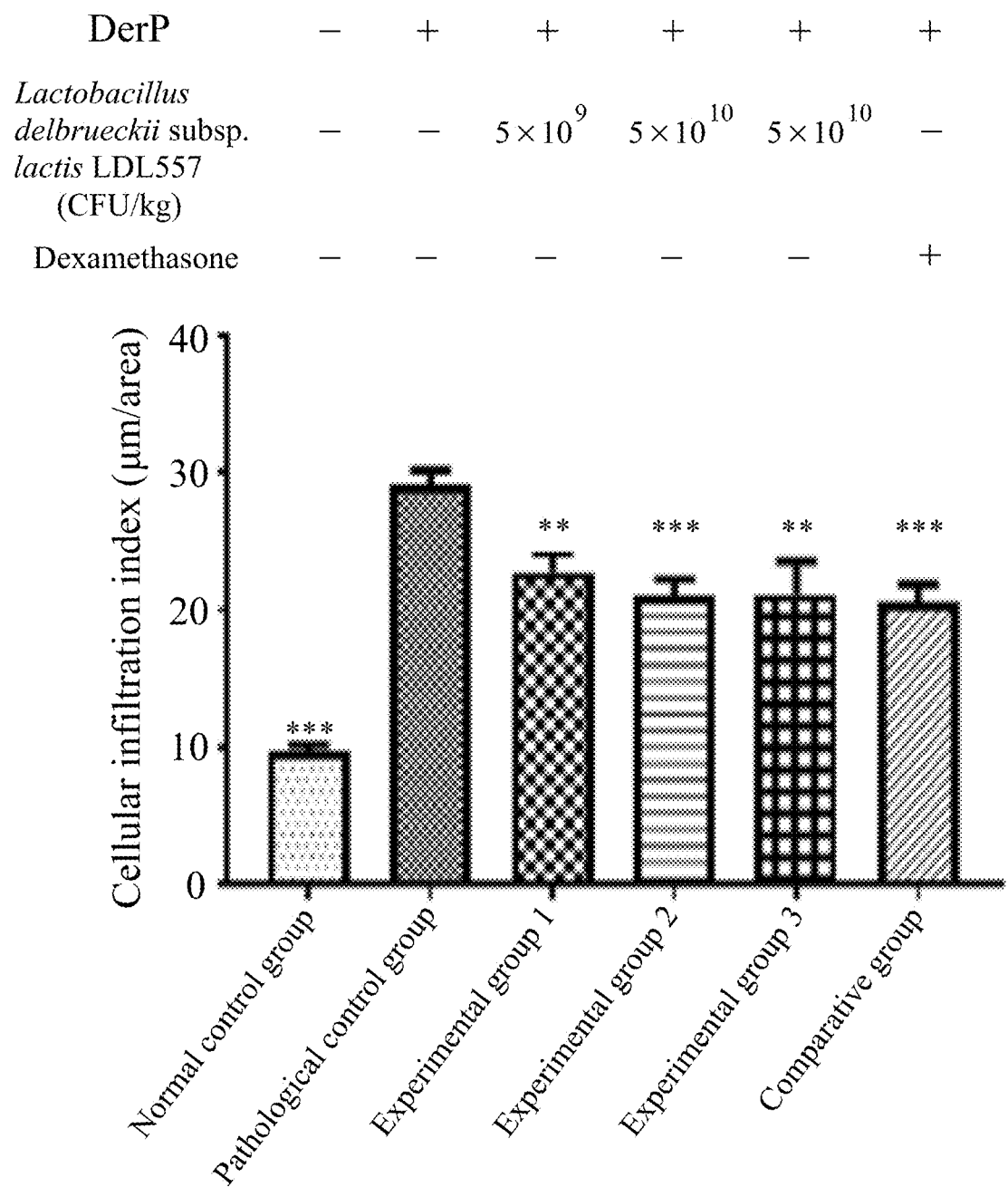
FIG. 12 shows the cellular infiltration index of each group of Example 6, infra, in which the symbols "" and "*" respectively represent $p<0.01$ and $p<0.001$ (compared with the pathological control group)

Referring to FIG. 12, the cellular infiltration indices determined in the experimental groups 1 to 3 were each significantly lower than that determined in the pathological control group, indicating that *Lactobacillus delbrueckii* subsp. *lactis* LDL557 of the present disclosure, whether in the form of live cells or dead cells, can effectively alleviate lung infiltration.

Summarizing the above test results, it is clear that *Lactobacillus delbrueckii* subsp. *lactis* LDL557 of the present disclosure is effective in alleviating asthma.

Example 7. In Vivo Anti-Colitis Test on *Lactobacillus delbrueckii* Subsp. *lactis* LDL557

A. Induction of Colitis and Administration of Bacterial Suspensions

The induction of colitis was conducted using a method slightly modified from that described by Im E. et al. (2009), *J. Nutr.*, 139:1848-1854. The female C57BL/6 mice (7 weeks old, with a body weight of approximately 19-21 g) were divided into four groups, including a normal control group, a pathological control group, and two experimental groups (i.e., experimental groups 1 to 2) (n=8 per group). The mice of the experimental group 1 were fed, via oral gavage, with the bacterial suspension of *Lactobacillus delbrueckii* subsp. *lactis* LDL557 prepared in section A of Example 5 at a dose of 9-10 log CFU/kg, and the mice of the experimental group 2 were fed, via oral gavage, with the heat-killed bacterial suspension of *Lactobacillus delbrueckii* subsp. *lactis* LDL557 prepared in section A of Example 4 at a dose of 9-10 log CFU/kg. In addition, each of the mice of the normal control group and pathological control group was fed, via oral gavage, with 0.2 mL of a 0.85% physiological salt solution. Each mouse was fed once daily for a 21-day treatment period.

Prior to the start of the treatment of the bacterial suspension or the physiological salt solution on the $14^{th}$, $16^{th}$, $18^{th}$, and $20^{th}$ days, the drinking water for the mice of the pathological control group and two experimental groups was replaced with water containing 2% dextran sodium sulfate (DSS) (MP biomedical, Cat. No. 9011-18-1), so as to induce the occurrence of colitis. The drinking water provided for the mice of the normal control group throughout the treatment period contained no DSS.

B. Analysis of Intestinal Permeability

On the 20th day, after the treatment of the bacterial suspension or the physiological salt solution, the respective mouse was subjected to determination of intestinal permeability using a method slightly modified from that described by Woo J. K. et al. (2016), *BMC Complement Altern. Med.*, doi: 10.1186/s12906-016-1479-0. Briefly, the mice of each group were fed, via oral gavage, with a 0.85% physiological salt solution containing 2 mg/mL fluorescein isothiocyanate-dextran 4000 (FITC-D4000) at a dose of 10 mL/kg. At the 4th hour after the administration of FITC-D4000, a blood sample was collected from the facial vein of each mouse through puncture, and was then subjected to centrifugation at 10,000 rpm and 4° C. for 5 minutes. The serum sample thus obtained was subjected to fluorescence spectroscopy. The fluorescence intensity of each group was detected using a fluorescence spectrometer (Hitachi F7000) at an excitation wavelength of 492 nm and an emission wavelength of 525 nm.

The fluorescence intensity thus obtained was subsequently converted to concentration expressed in μg/mL based on a correlation curve previously prepared by plotting different known concentrations (40, 20, 10, 5, 2.5, 1.25, and 0.625 μg/mL) of FITC-D4000 standards versus their fluorescence intensities. The data thus obtained were analyzed according to the method described in section 1 of "General Procedures".

Figure 13:
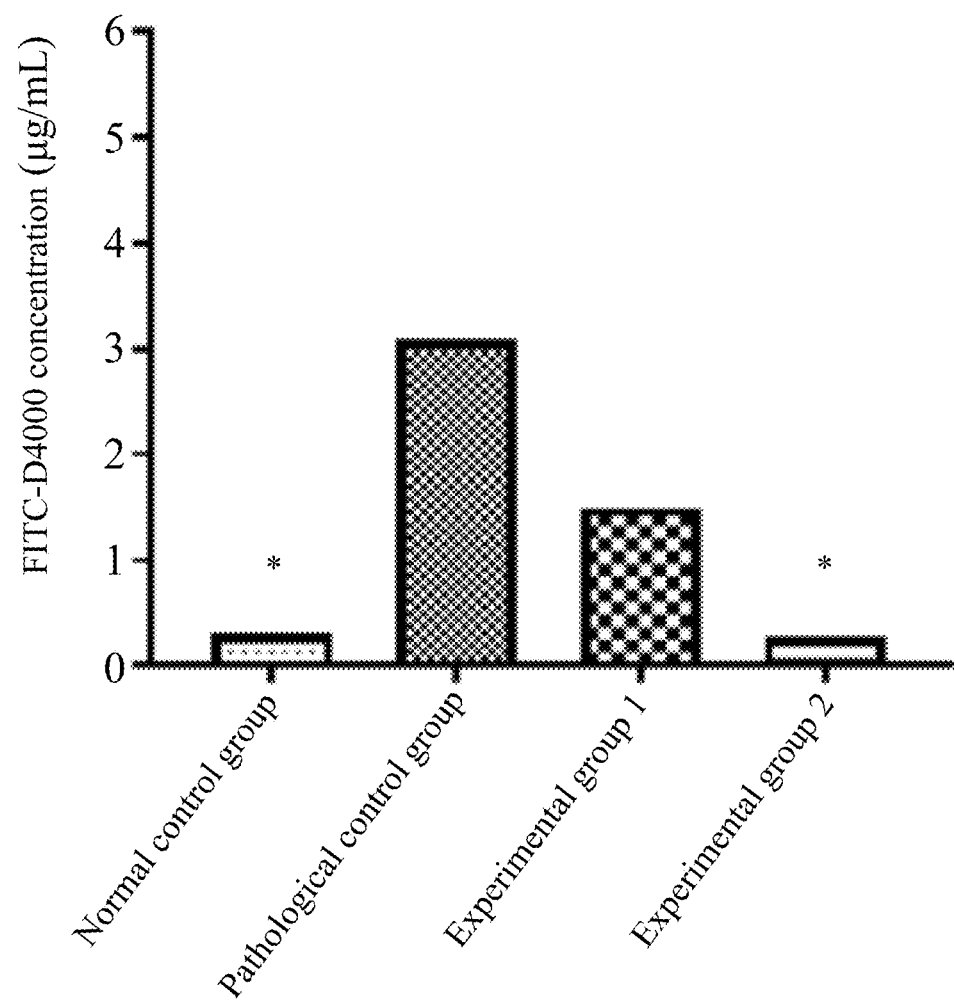
FIG. 13 shows the fluorescein isothiocyanate-dextran 4000 (FITC-D4000) concentration of each group of Example 7, infra, in which the symbol "*" represents $p<0.05$ (compared with the pathological control group)

Referring to FIG. 13, the FITC-D4000 concentrations determined in the experimental groups 1 and 2 were each lower than that determined in the pathological control group, indicating that *Lactobacillus delbrueckii* subsp. *lactis* LDL557 of the present disclosure, whether in the form of live cells or dead cells, can effectively alleviate colitis, and can maintain the intestinal barrier function and the intestinal permeability.

C. Histopathologic Analysis

After the 21-day treatment period, the respective mouse was sacrificed by virtue of 95% $CO_2$ asphyxiation, and the colon tissue was obtained from the respective mouse carcass. The colon tissue was washed with an ice-cooled physiological salt solution, followed by determining the length and photographing. A colon tissue sample having a length of about 1-2 cm was obtained from the respective washed colon tissue, followed by fixation with a 10% paraformaldehyde solution (in PBS) at room temperature for 24 hours. The fixed tissue sample was then embedded with paraffin, followed by slicing to obtain a tissue section having a thickness of about 3-5 μm.

The tissue section was stained with hematoxylin and eosin (H&E) using a staining protocol well-known to those skilled in the art, and was then observed under an optical microscope (Carl Zeiss, Oberkochen, Germany) at 200× magnification. One area of the respective tissue section was randomly selected and photographed, and the pathological change in the respective tissue section was assessed according to the method described in Liu Y. W. et al. (2011), *Int. Immunopharmacol.*, 11:2159-2166. The degree of colitis was ranked with a score ranging from 0 to 12, and the higher scale indicated the higher severity of colitis.

The data thus obtained were analyzed according to the method described in section 1 of "General Procedures".

Figure 14:
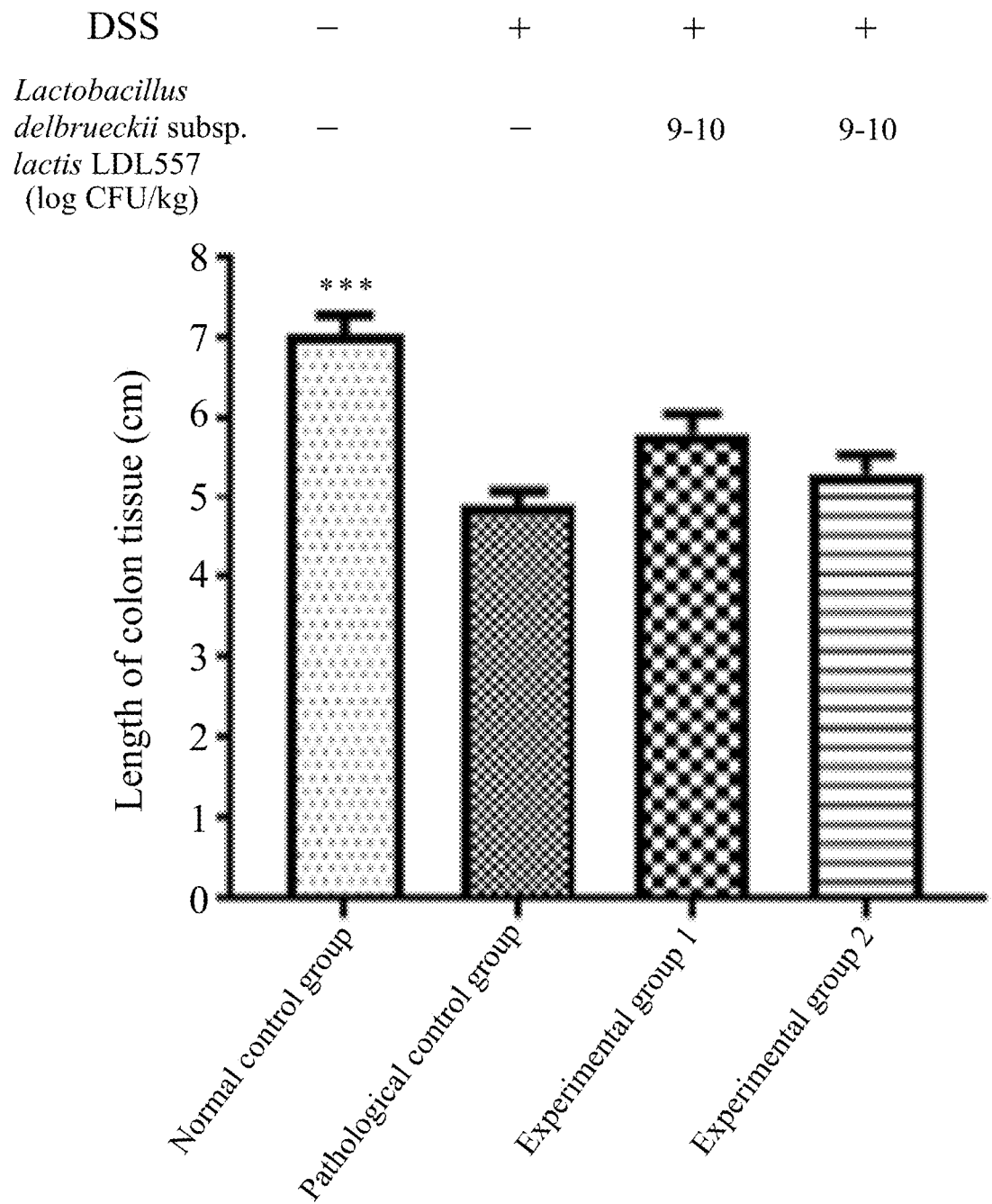
FIG. 14 shows the length of the colon tissue in each group of Example 7, infra, in which the symbol "***" represents $p<0.001$ (compared with the pathological control group)
Figure 15:
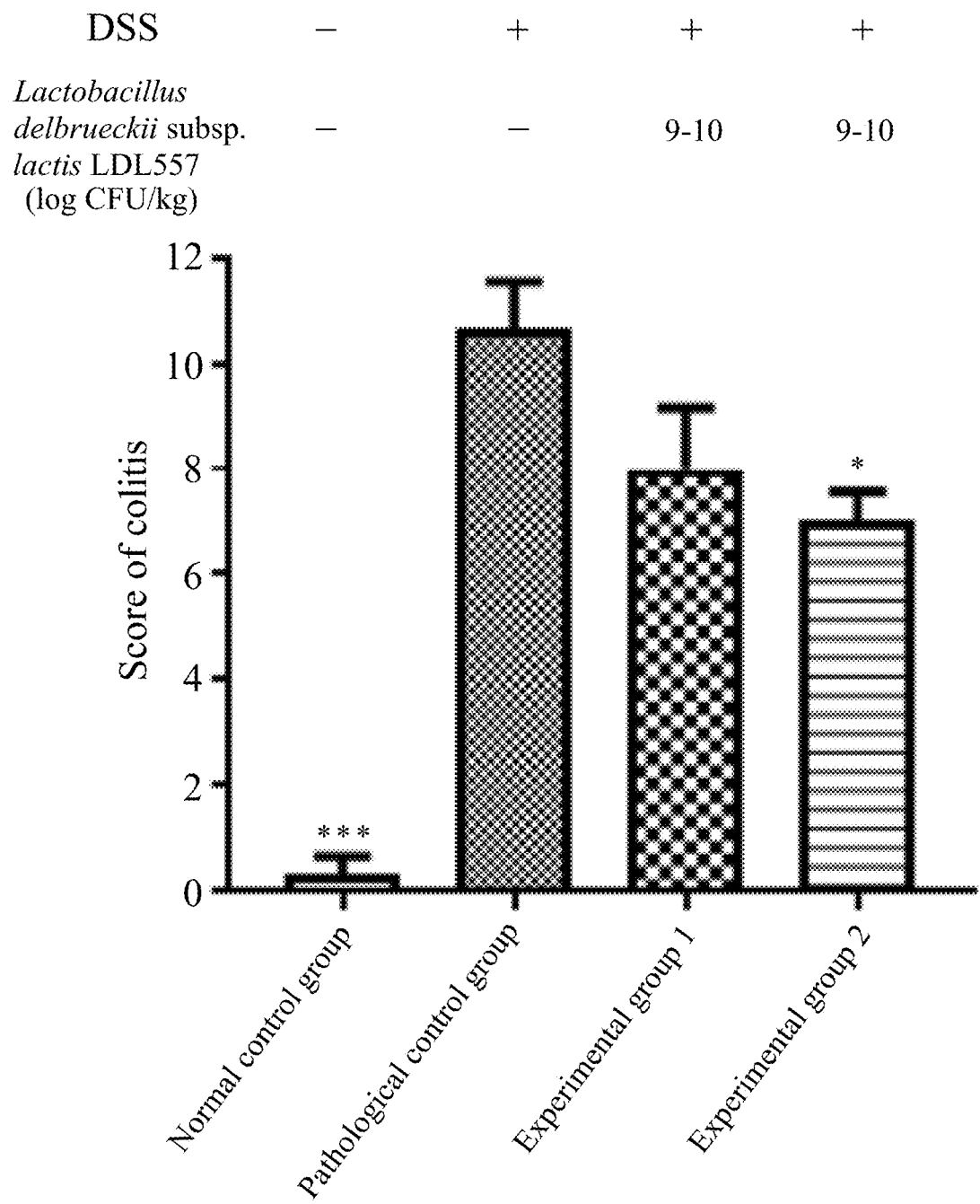
FIG. 15 shows the score of colitis in each group of Example 7, infra, in which the symbols "*" and "***" respectively represent $p<0.05$ and $p<0.001$ (compared with the pathological control group)

Referring to FIGS. 14 and 15, the lengths of the colon tissues determined in the experimental groups 1 and 2 were each longer than that determined in the pathological control group, and the scores of colitis determined in the experimental groups 1 and 2 were each apparently or significantly lower than that determined in the pathological control group. These results indicate that *Lactobacillus delbrueckii* subsp. *lactis* LDL557 of the present disclosure, whether in the form of live cells or dead cells, can effectively alleviate colitis.

D. Determination of Tumor Necrosis Factor-α (TNF-α) Content in Colon Tissue

A colon tissue sample having a length of 1 cm was obtained from the respective colon tissue obtained in section C of this example, followed by washing with sterile PBS containing protease inhibitor (Sigma, Cat. No. P1860). The respective washed colon tissue sample was incubated with 1 mL of an RPMI 1640 medium (supplemented with 100 IU/mL penicillin, 0.1 mg/mL streptomycin, 0.25 μg/mL amphotericin B, protease inhibitor, and 1% L-glutamate), followed by cultivation in an incubator (37° C., 5% $CO_2$) for 24 hours.

After centrifugation at 3,000 rpm for 15 minutes, the resultant supernatant was collected, and was then subjected to determination of TNF-α content using a TNF-α ELISA kit (Cat. No. BMS607-3TEN, Invitrogen).

The data thus obtained were analyzed according to the method described in section 1 of "General Procedures".

Figure 16:
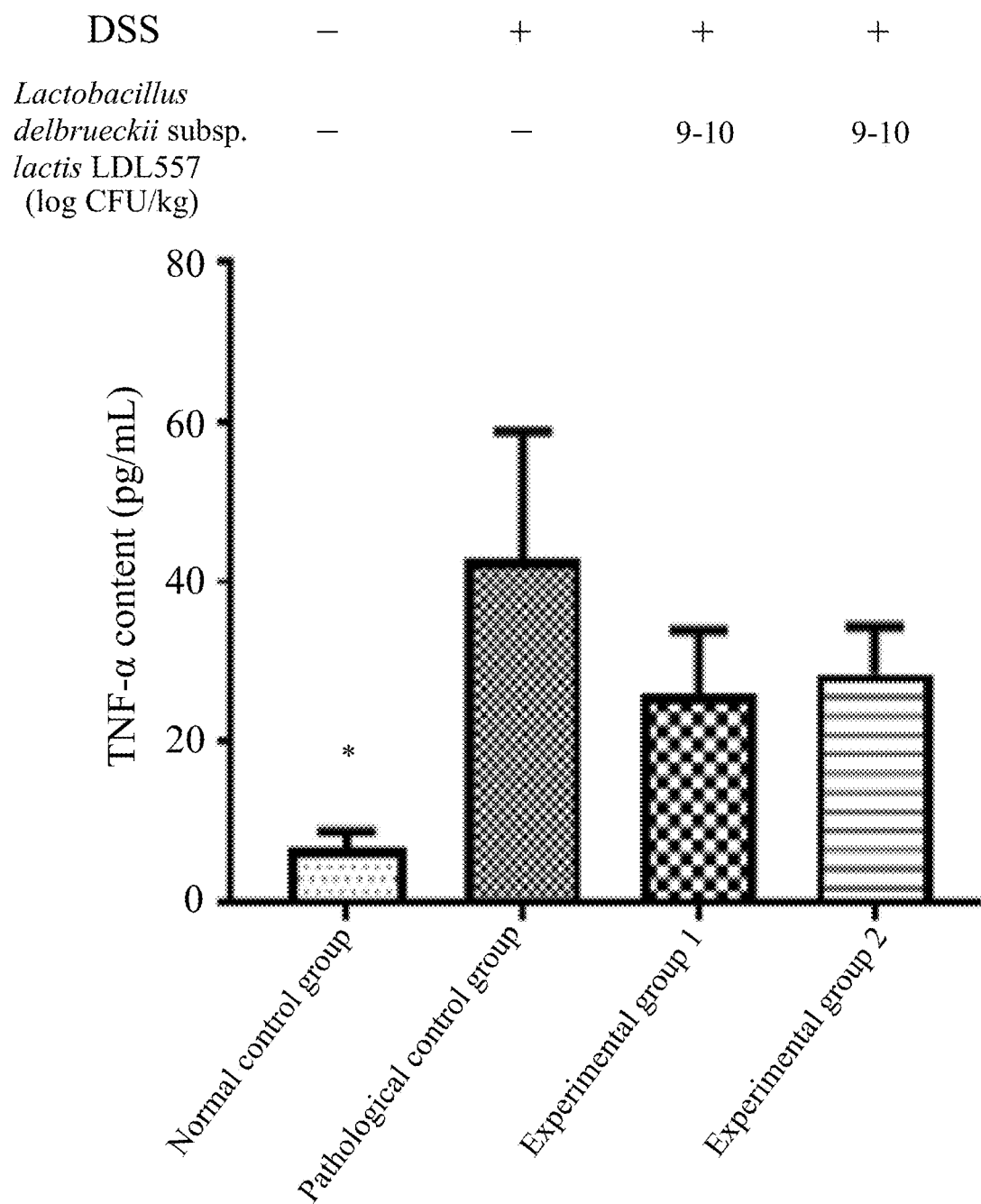
FIG. 16 shows the TNF-α content in each group of Example 7, infra, in which the symbol "*" represents $p<0.05$ (compared with the pathological control group)

Referring to FIG. 16, the TNF-α contents determined in the experimental groups 1 and 2 were each lower than that determined in the pathological control group. This result suggests that *Lactobacillus delbrueckii* subsp. *lactis* LDL557 of the present disclosure, whether in the form of live cells or dead cells, can effectively reduce inflammatory markers in colon tissues.

Example 8. In Vivo Anti-Arthritis Test on *Lactobacillus delbrueckii* Subsp. *lactis* LDL557

A. Preparation of Bovine Type II Collagen (CII) Emulsion

CII (Chondrex Inc., Cat. No. 20022) was mixed with incomplete freund adjuvant (IFA) (Sigma-Aldrich, Cat. No. F5506) at a ratio of 1:1 (v/v), so as to obtain a CII emulsion.

B. Induction of Arthritis and Administration of Bacterial Suspensions

The female SD rats (6 weeks old, with a body weight of approximately 160-180 g) were divided into four groups, including a normal control group, a pathological control group, and two experimental groups (i.e., experimental groups 1 to 2) (n=12 per group). The rats of the experimental group 1 were fed, via oral gavage, with the bacterial suspension of *Lactobacillus delbrueckii* subsp. *lactis* LDL557 prepared in section A of Example 5 at a dose of 5×10$^8$ CFU/kg, and the rats of the experimental group 2 were fed, via oral gavage, with the heat-killed bacterial suspension of *Lactobacillus delbrueckii* subsp. *lactis* LDL557 prepared in section A of Example 4 at a dose of 5×10$^8$ CFU/kg. In addition, each of the rats of the normal control group and pathological control group was fed, via oral gavage, with 1 mL of a 0.85% physiological salt solution. Each mouse was fed once daily for a 42-day treatment period.

On the 14$^{th}$ day, after the treatment of the bacterial suspension or the physiological salt solution, 200 μL of the CII emulsion prepared in section A of this example was injected subcutaneously into the tail of the respective one of the rats of the pathological control group and two experimental groups. The rats were given a boost injection on the 7th day after the initial immunization, so as to induce the occurrence of arthritis. In addition, the rats of the normal control group were injected with PBS.

C. Morphological Observation

On the 28th day, after the treatment of the bacterial suspension or the physiological salt solution, changes (i.e., swelling and enlargement) in the joints of the four paws of each rat were assessed visually.

Based on the result of the morphological observation (data not shown), it was found that in the pathological control group, severe swelling and enlargement in the joints of the four paws were observed. In contrast, in the experimental groups 1 and 2, swelling and enlargement in the joints of the four paws were sufficiently ameliorated.

D. Determination of CII-Specific IgG Level in Serum Sample

After the 42-day treatment period, a blood sample was collected from the tail artery of each rat through arterial puncture, and was then subjected to centrifugation at 5,000 rpm and 4° C. for 15 minutes. The serum sample thus obtained was diluted 10$^6$-fold with phosphate-buffered saline (PBS).

100 μL of a 5 μg/mL CII solution (in PBS) was added to a respective well of a 96-well culture plate, followed by being left standing at room temperature overnight. Afterwards, 100 μL of the respective diluted serum sample was added to the corresponding well, followed by being left standing at room temperature for 2 hours. Thereafter, the contents of CII-specific IgG, IgG2a, and IgG2b were determined using an IgG (total) rat uncoated ELISA Kit (Invitrogen, Cat. No. 88-50490-88), an IgG2a rat uncoated ELISA Kit (Invitrogen, Cat. No. 88-50510-88), and an IgG2b rat uncoated ELISA Kit (Invitrogen, Cat. No. 88-50520-88) in accordance with the manufacturer's instructions.

The data thus obtained were analyzed according to the method described in section 1 of "General Procedures".

Figure 17:
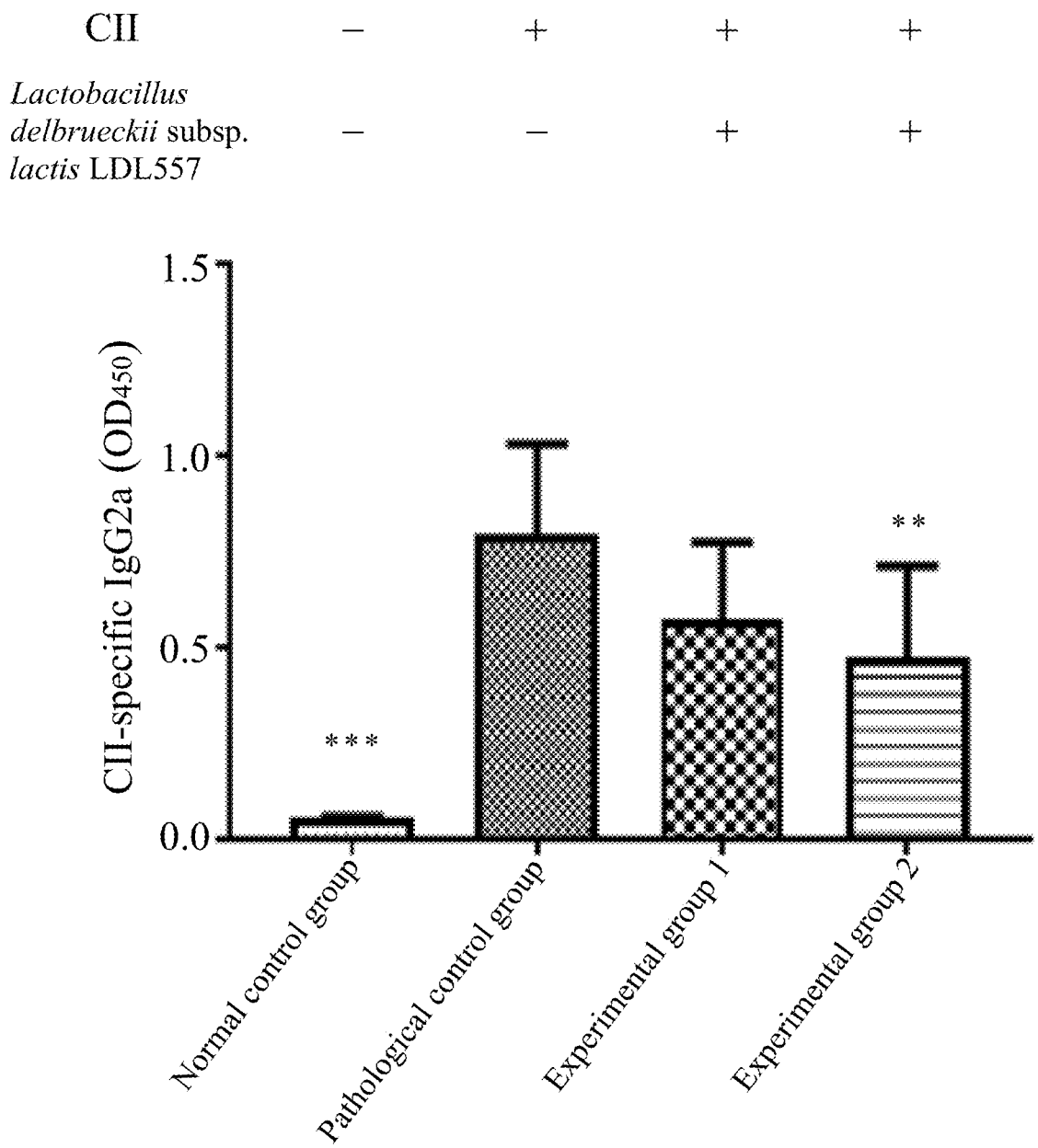
FIG. 17 shows the $OD_{450}$ value of type II collagen (CII)-specific IgG2a in each group of Example 8, infra, in which the symbols "" and "*" respectively represent $p<0.01$ and $p<0.001$ (compared with the pathological control group)
Figure 18:
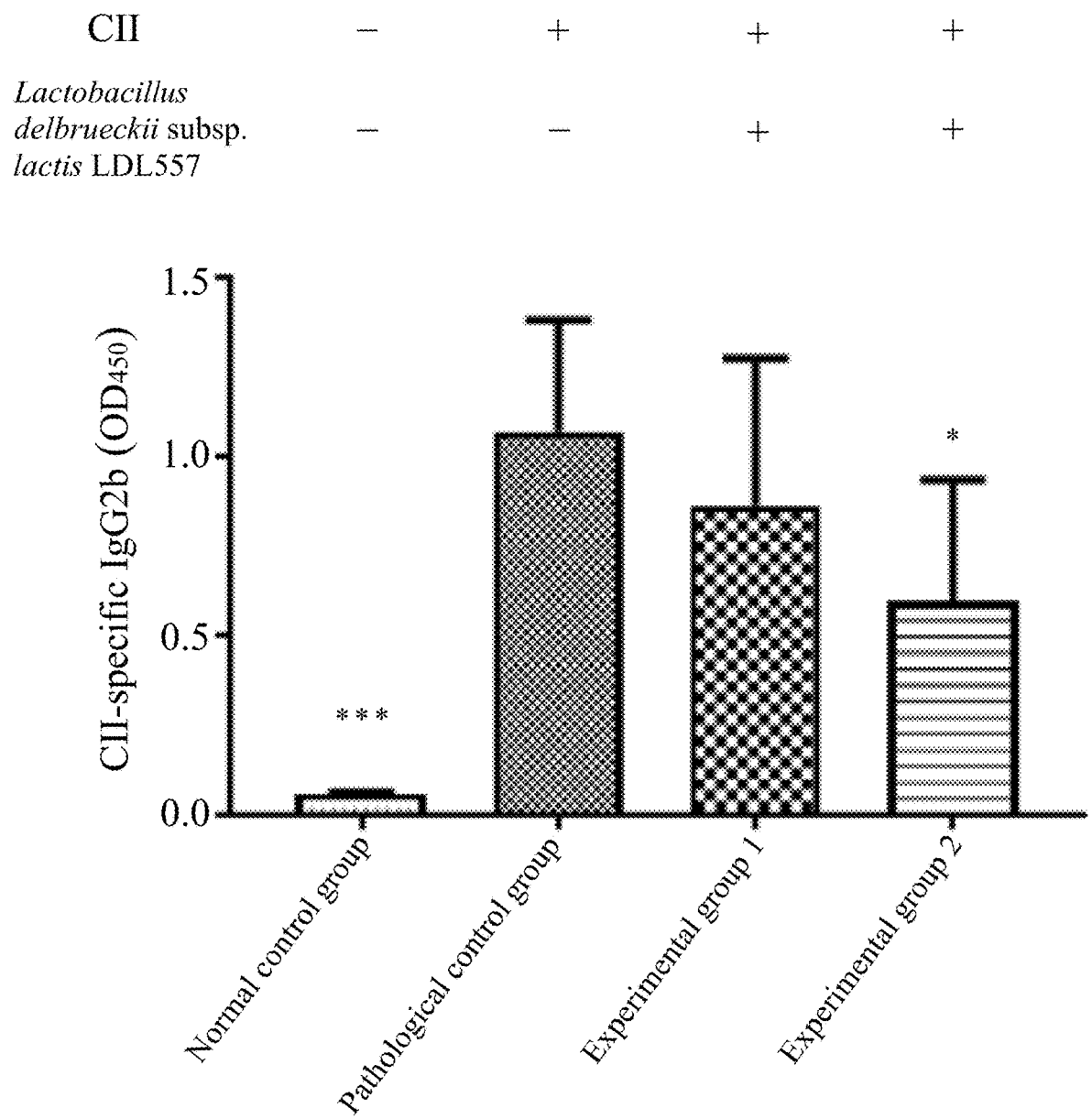
FIG. 18 shows the $OD_{450}$ (optical density at 450 nm) value of CII-specific IgG2b in each group of Example 8, infra, in which the symbols "*" and "***" respectively represent $p<0.05$ and $p<0.001$ (compared with the pathological control group)
Figure 19:
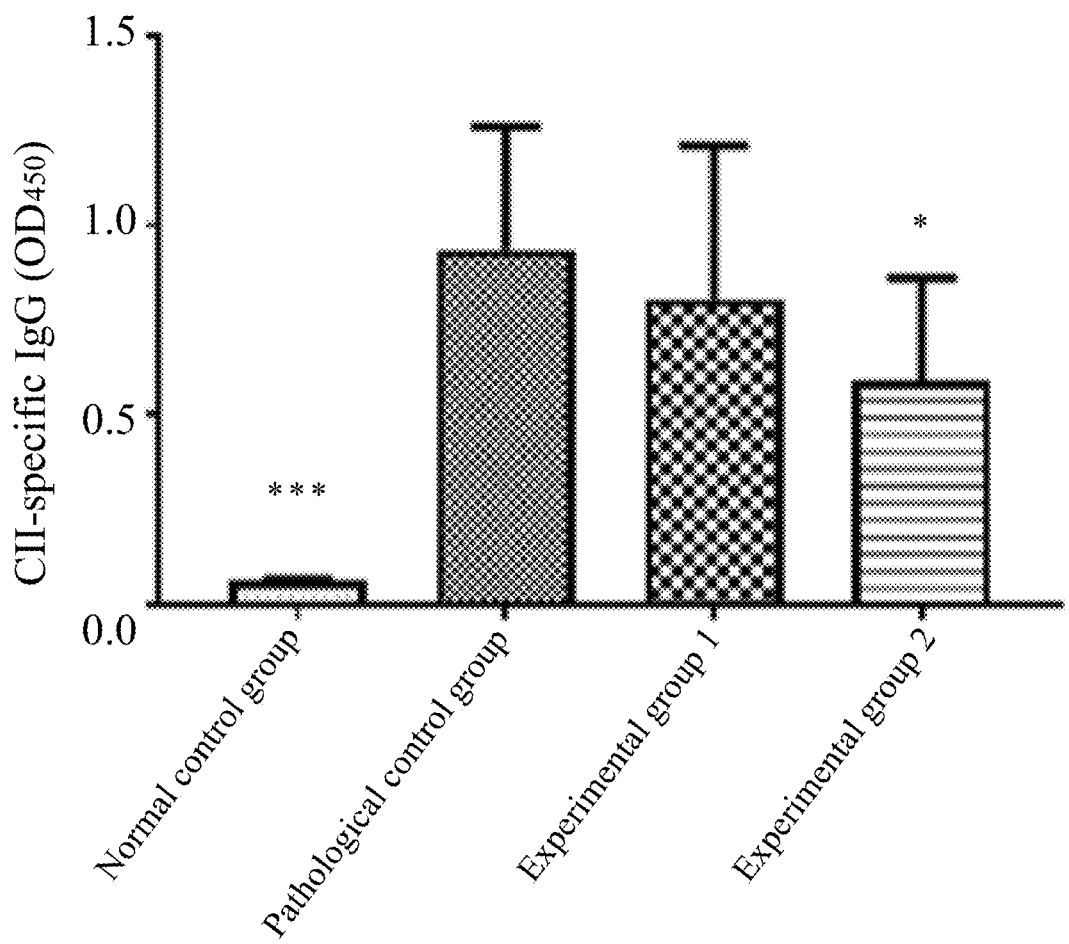
FIG. 19 shows the $OD_{450}$ value of CII-specific IgG in each group of Example 8, infra, in which the symbols "*" and "***" respectively represent $p<0.05$ and $p<0.001$ (compared with the pathological control group)

Referring to FIGS. 17 to 19, the $OD_{450}$ (optical density at 450 nm) values of CII-specific IgG2a, IgG2b, and IgG determined in each of the experimental groups 1 and 2 were apparently or significantly lower than those determined in the pathological control group. The results indicate that *Lactobacillus delbrueckii* subsp. *lactis* LDL557 of the present disclosure, whether in the form of live cells or dead cells, can effectively reduce the CII-specific IgG2a, IgG2b, and IgG levels in the serum.

E. Expression Profile of Sirtuin-1 (SIRT1) and Cyclooxygenase-2 (COX-2) in Ankle Tissue After completion of the determination of CII-specific IgG level as described in section D of this example, the respective rat was sacrificed by virtue of 95% $CO_2$ asphyxiation. An ankle tissue was obtained from the respective rat carcass, and was then ground using liquid nitrogen, so as to obtain a ground ankle tissue sample. 0.2 g of the respective ground ankle tissue sample was mixed with 300 μL of a RIPA lysis buffer (VWR Life Science, Cat. No. N653) containing protease inhibitor cocktail (VWR Life Science, Cat. No. M221), phosphatase inhibitor cocktail (BioVision, Cat. No. K282), and EDTA. The resultant mixture was left to stand at 4° C. for 30 minutes. After centrifugation at 14,000 rpm and 4° C. for 15 minutes, the supernatant thus obtained served as a total protein sample. The protein concentration in the total protein sample was determined using Bio-Rad protein assay dye reagent concentrate (Bio-Rad Laboratories, USA).

The total protein sample of the respective rat was subjected to sodium dodecyl sulfate-polyacrylamide gel electrophoresis (SDS-PAGE) analysis and Western Blotting analysis for detection of SIRT1 and COX-2 by virtue of the technique well known to and routinely used by one skilled in the art. In addition, β-actin was used as an internal control.

The instruments and reagents used for SDS-PAGE analysis and Western Blotting analysis are as follows:

(1) SDS-PAGE analysis was performed using a Mini-PROTEAN® electrophoresis system (Bio-Rad).

(2) Protein transfer was performed using a Mini Trans-Blot® electrophoretic transfer cell (Bio-Rad) and a polyvinylidene difluoride (PVDF) membrane.

(3) In Western Blotting analysis, primary and secondary antibodies used for detecting each protein are shown in Table 6.

TABLE 6

| Protein | Primary antibody | Secondary antibody |
| --- | --- | --- |
| SIRT1 | Rabbit anti SIRT1 polyclonal antibody (Millipore, Cat. No. 07-131) | Goat anti rabbit IgG-horseradish peroxidase (HRP) antibody (Thermo Fisher Scientific, Cat. No. G-21234) |
| COX-2 | Rabbit anti COX-2 polyclonal antibody (Abcam, Cat. No. ab15191) | |

TABLE 6-continued

| Protein | Primary antibody | Secondary antibody |
| --- | --- | --- |
| β-actin | Mouse anti β-actin monoclonal antibody (Cell Signaling Technology, Cat. No. 3700) | Rabbit anti mouse IgG-HRP antibody (Thermo Fisher Scientific, Cat. No. A27025) |

(4) Chemiluminescence staining was performed using an enhanced chemiluminescent (ECL) substrate for horseradish peroxidase (HRP) enzyme (i.e., SuperSignal™ West Femto maximum sensitivity substrate) (Thermo Fisher Scientific, Cat. No. TG268240A), and signal detection was performed using a western blot imaging system (i.e., ChemiDoc™ imaging system) (Bio-Rad).

Subsequently, ImageJ Imaging Software was used for semi-quantitatively calculating the corresponding protein expression level. The expression level of the respective one of SIRT1 and COX-2 in each group was normalized by the expression level of corresponding β-actin thereof.

The relative expression level was calculated using the following Equation (I):

$$A = B/C \quad (I)$$

where
A=relative expression level of SIRT1 or COX-2
B=normalized expression level of SIRT1 or COX-2 of respective group
C=normalized expression level of SIRT1 or COX-2 of normal control group The data thus obtained were analyzed according to the method described in section 1 of "General Procedures".

Figure 20:
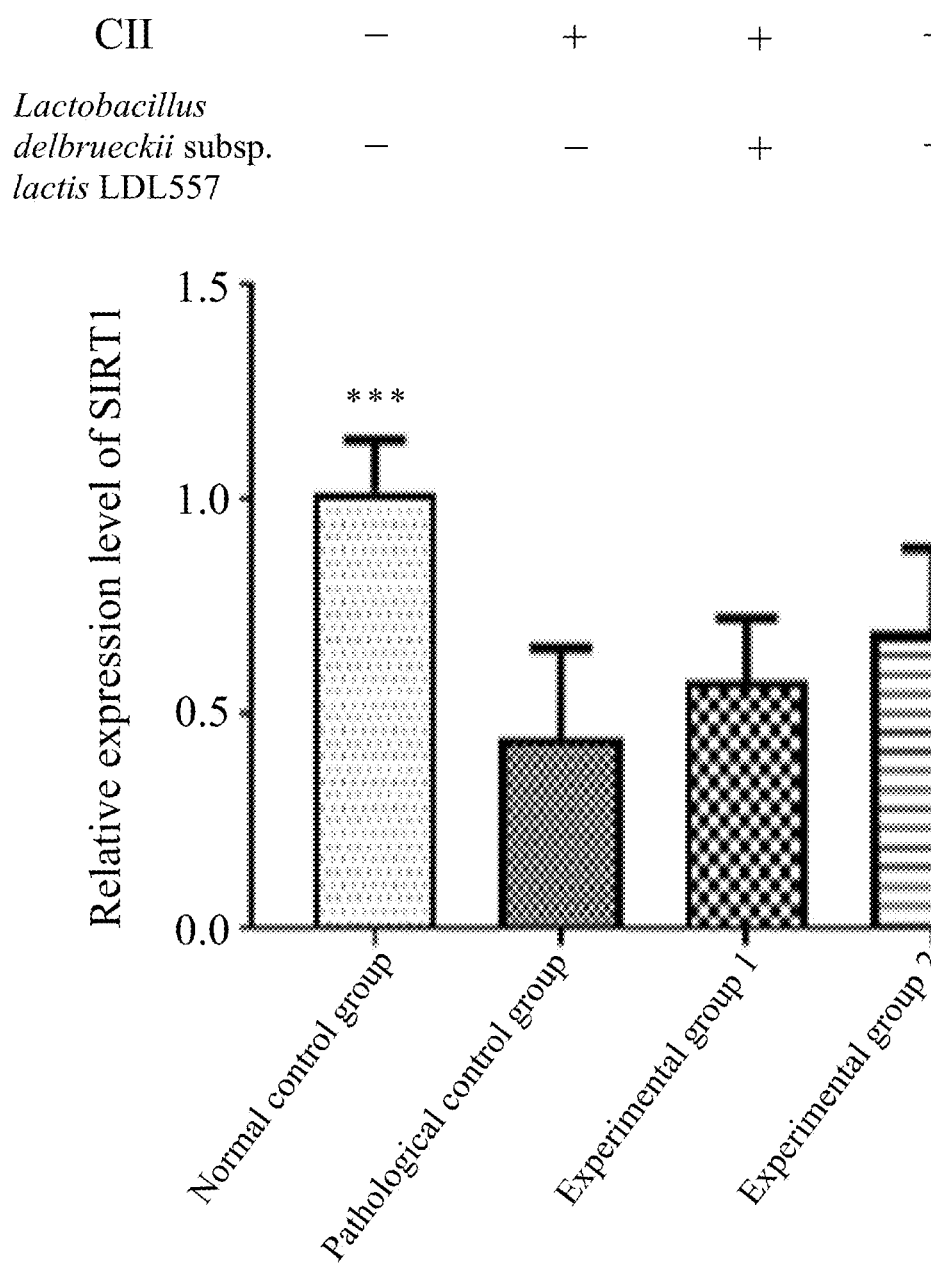
FIG. 20 shows the relative expression level of SIRT1 in each group of Example 8, infra, in which the symbol "***" represents $p<0.001$ (compared with the pathological control group)
Figure 21:
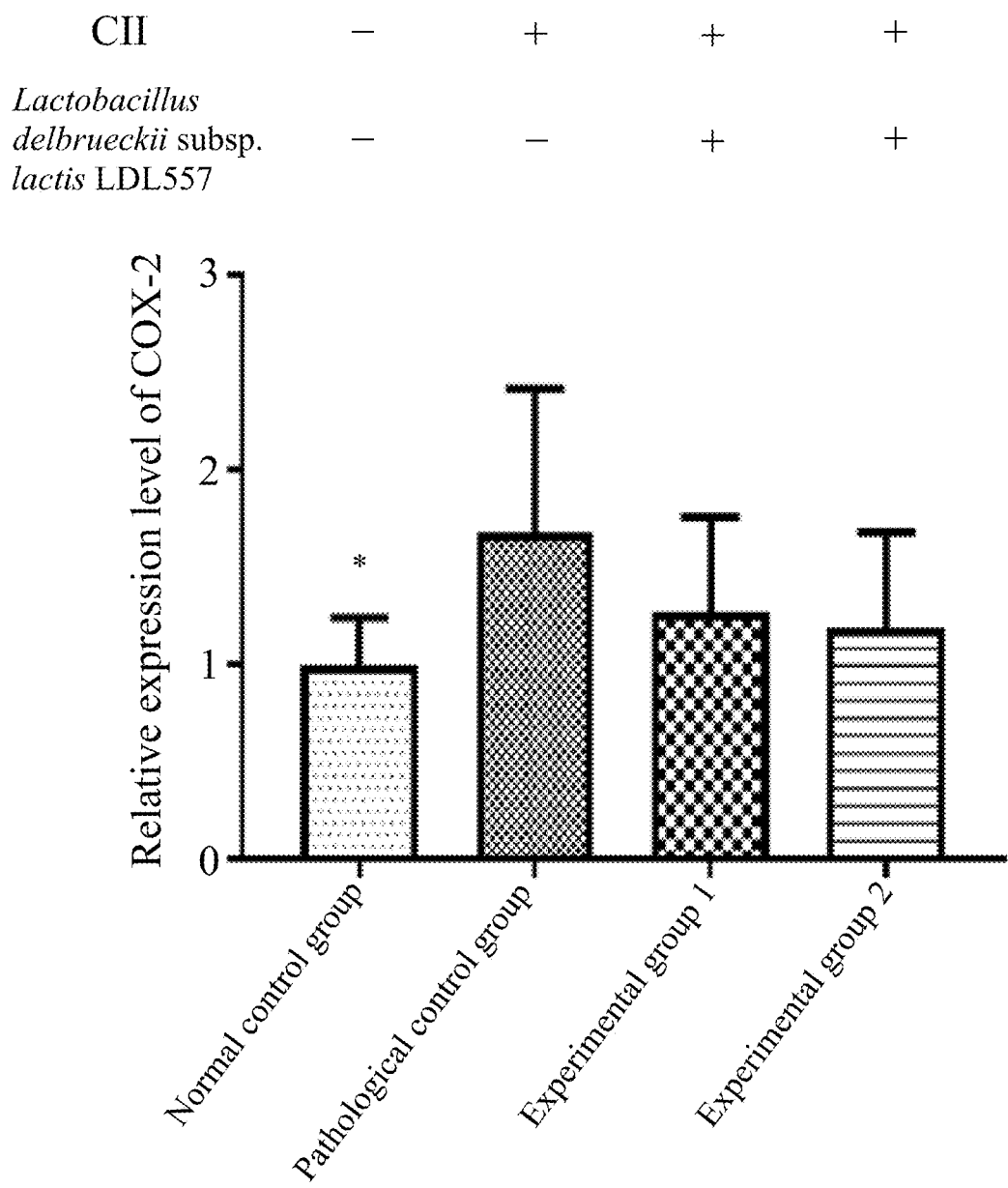
FIG. 21 shows the relative expression level of COX-2 in each group of Example 8, infra, in which the symbol "*" represents $p<0.05$ (compared with the pathological control group).

Referring to FIGS. 20 and 21, the relative expression levels of SIRT1 determined in the experimental groups 1 and 2 were each higher than that determined in the pathological control group, and the relative expression levels of COX-2 determined in the experimental groups 1 and 2 were each lower than that determined in the pathological control group. The results indicate that *Lactobacillus delbrueckii* subsp. *lactis* LDL557 of the present disclosure, whether in the form of live cells or dead cells, can effectively alleviate arthritis.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for alleviating colitis, comprising:
   administering, to a subject in need thereof, a composition including an isolated strain of *Lactobacillus delbrueckii* subsp. *lactis* LDL557,
   wherein the isolated strain of *Lactobacillus delbrueckii* subsp. *lactis* LDL557 is deposited at Deutsche Sammlung von Mikroorganismen und Zellkulturen GmbH under accession number DSM 33617.

2. The method as claimed in claim 1, wherein the composition is a food product or a pharmaceutical composition.

3. The method as claimed in claim 2, wherein the pharmaceutical composition is administered by a route selected from the group consisting of oral administration, parenteral administration, respiratory tract administration, and topical administration.

* * * * *

SEQUENCE LISTING

```
<160> NUMBER OF SEQ ID NOS: 3

<210> SEQ ID NO 1
<211> LENGTH: 20
<212> TYPE: DNA
<213> ORGANISM: Artificial Sequence
<220> FEATURE:
<223> OTHER INFORMATION: Forward primer 27F for PCR amplification of
      bacterial 16S rDNA fragment

<400> SEQUENCE: 1
agagtttgat cctggctcag                                              20

<210> SEQ ID NO 2
<211> LENGTH: 18
<212> TYPE: DNA
<213> ORGANISM: Artificial Sequence
```

```
<220> FEATURE:
<223> OTHER INFORMATION: Reverse primer 1492R for PCR amplification of
      bacterial 16S rDNA fragment

<400> SEQUENCE: 2
ggttaccttg ttacgact                                                    18

<210> SEQ ID NO 3
<211> LENGTH: 1523
<212> TYPE: DNA
<213> ORGANISM: Lactobacillus delbrueckii subsp. lactis

<400> SEQUENCE: 3
tcaggacgaa cgctggcggc gtgcctaata catgcaagtc gagcgagctg aattcaaaga      60
tcccttcggg gtgatttgtt ggacgctagc ggcggatggg tgagtaacac gtgggcaatc     120
tgccctaaag actgggatac cacttggaaa caggtgctaa taccggataa caacatgaat     180
cgcatgattc aagtttgaaa ggcggcgcaa gctgtcactt taggatgagc ccgcggcgca     240
ttagctagtt ggtggggtaa aggcctacca aggcaatgat gcgtagccga gttgagagac     300
tgatcggcca cattgggact gagacacggc ccaaactcct acgggaggca gcagtaggga     360
atcttccaca atgacgcaa gtctgatgga gcaacgccgc gtgagtgaag aaggtcttcg      420
gatcgtaaag ctctgttgtt ggtgaagaag atagaggca gtaactggtc tttatttgac      480
ggtaatcaac cagaaagtca cggctaacta cgtgccagca gccgcggtaa tacgtaggtg     540
gcaagcgttg tccggattta ttgggcgtaa agcgagcgca ggcggaatga taagtctgat     600
gtgaaagccc acggctcaac cgtggaactg catcggaaac tgtcattctt gagtgcagaa     660
gaggagagtg gaactccatg tgtagcggtg gaatgcgtag atatatggaa gaacaccagt     720
ggcgaaggcg gctctctggt ctgcaactga cgctgaggct cgaaagcatg ggtagcgaac     780
aggattagat accctggtag tccatgccgt aaacgatgag cgctaggtgt tggggacttt     840
ccggtcctca gtgccgcagc aaacgcatta agcgctccgc ctggggagta cgaccgcaag     900
gttgaaactc aaaggaattg acgggggccc gcacaagcgg tggagcatgt ggtttaattc     960
gaagcaacgc gaagaacctt accaggtctt gacatcctgc gctacaccta gataggtg      1020 gttcccttcg gggacgcaga gacaggtggt gcatggctgt cgtcagctcg tgtcgtgaga    1080
tgttgggtta agtcccgcaa cgagcgcaac ccttgtcttt agttgccatc attaagttgg    1140
gcactctaaa gagactgccg gtgacaaacc ggaggaaggt ggggatgacg tcaagtcatc    1200
atgcccctta tgacctgggc tacacacgtg ctacaatggg cagtacaacg agaagcaaac    1260
ccgcgagggt aagcggatct cttaaagctg ctctcagttc ggactgcagg ctgcaactcg    1320
cctgcacgaa gctggaatcg ctagtaatcg cggatcagca cgccgcggtg aatacgttcc    1380
cgggccttgt acacaccgcc cgtcacacca tggaagtctg caatgcccaa agtcggtgag    1440
ataaccttta taggagtcag ccgcctaagg cagggcagat gactggggtg aagtcgtaac    1500
aaggtagccg taggagaacc tgc                                            1523
```